US012542208B2

(12) United States Patent
Hanajima et al.

(10) Patent No.: US 12,542,208 B2
(45) Date of Patent: Feb. 3, 2026

(54) ALERT NOTIFICATION DEVICE OF DENTAL PROCESSING MACHINE, ALERT NOTIFICATION SYSTEM, AND NON-TRANSITORY RECORDING MEDIUM STORING COMPUTER PROGRAM FOR ALERT NOTIFICATION

(71) Applicant: DGSHAPE Corporation, Hamamatsu (JP)

(72) Inventors: Masaki Hanajima, Hamamatsu (JP); Akira Otaka, Hamamatsu (JP)

(73) Assignee: DGSHAPE Corporation, Shizuoka (JP)

( * ) Notice: Subject to any disclaimer, the term of this patent is extended or adjusted under 35 U.S.C. 154(b) by 565 days.

(21) Appl. No.: 17/551,769

(22) Filed: Dec. 15, 2021

(65) Prior Publication Data

US 2022/0189621 A1 Jun. 16, 2022

(30) Foreign Application Priority Data

Dec. 16, 2020 (JP) ................. 2020-208182

(51) Int. Cl.
*G16H 40/40* (2018.01)
(52) U.S. Cl.
CPC .................. *G16H 40/40* (2018.01)
(58) Field of Classification Search
None
See application file for complete search history.

(56) References Cited

U.S. PATENT DOCUMENTS

| 6,089,740 | A | * | 7/2000 | Forehand | G02B 6/0006 |
| | | | | | 313/643 |
| 2001/0056335 | A1 | | 12/2001 | Ikeda et al. | |
| 2015/0174716 | A1 | | 6/2015 | Suyama | |
| 2016/0012182 | A1 | * | 1/2016 | Golay | G16H 40/20 |
| | | | | | 705/3 |

(Continued)

FOREIGN PATENT DOCUMENTS

| CN | 108847008 A | 11/2018 |
| CN | 109605101 A | 4/2019 |

(Continued)

OTHER PUBLICATIONS

Patil, R. B., Kothavale, B. S., & Waghmode, L. Y. (2019). Selection of time-to-failure model for computerized numerical control turning center based on the assessment of trends in maintenance data. Proceedings of the institution of mechanical engineers, 233 (2), 105-117. (Year: 2019).*

(Continued)

*Primary Examiner* — Lena Najarian
(74) *Attorney, Agent, or Firm* — Keating & Bennett, LLP

(57) ABSTRACT

An alert notification device of a dental processing machine includes a receiver, a first extractor, and a notifier. The receiver receives error information from the dental processing machine. The first extractor extracts from the error information received by the receiver, as first extracted error information, error information that occurred in a predetermined first time. The notifier notifies a management device to be used by a maintenance company to perform maintenance of the dental processing machine, of an alert concerning the first extracted error information.

12 Claims, 11 Drawing Sheets

(56) References Cited

U.S. PATENT DOCUMENTS

| | | | |
|---|---|---|---|
| 2017/0293283 A1 | 10/2017 | Li et al. | |
| 2018/0353275 A1* | 12/2018 | St. Louis | A61C 1/0007 |
| 2019/0025811 A1 | 1/2019 | Nakajima et al. | |
| 2019/0244707 A1* | 8/2019 | Becker | H04L 67/52 |
| 2019/0290383 A1* | 9/2019 | Yaginuma | A61B 90/06 |
| 2020/0238462 A1 | 7/2020 | Kumazaki | |
| 2021/0154798 A1* | 5/2021 | Huber | B24B 27/0092 |

FOREIGN PATENT DOCUMENTS

| | | | |
|---|---|---|---|
| CN | 111163899 A | 5/2020 | |
| CN | 112053533 A | 12/2020 | |
| EP | 168 130 A1 | 1/2002 | |
| EP | 3 332 906 A1 | 6/2018 | |
| EP | 3 699 702 A1 | 8/2020 | |
| EP | 3695805 A1 | 8/2020 | |
| JP | 2002006942 A | 1/2002 | |
| JP | 2003067049 A | 3/2003 | |
| JP | 2015-120222 A | 7/2015 | |
| JP | 2018060260 A | 4/2018 | |
| JP | 2018-089763 A | 6/2018 | |
| JP | 2018156486 A | 10/2018 | |
| JP | 2019021008 A | 2/2019 | |
| JP | 2020-135012 A | 8/2020 | |
| JP | 2020-135013 A | 8/2020 | |
| JP | 2020-135355 A | 8/2020 | |
| JP | 2020135261 A | 8/2020 | |
| JP | 2020157383 A | 10/2020 | |
| WO | WO-2013102900 A1 * | 7/2013 | B23Q 17/2404 |

OTHER PUBLICATIONS

Official Communication issued in European Patent Application No. 21214398.6 mailed on May 9, 2022.

\* cited by examiner

ALERT NOTIFICATION DEVICE OF DENTAL PROCESSING MACHINE, ALERT NOTIFICATION SYSTEM, AND NON-TRANSITORY RECORDING MEDIUM STORING COMPUTER PROGRAM FOR ALERT NOTIFICATION

CROSS REFERENCE TO RELATED APPLICATIONS

This application claims the benefit of priority to Japanese Patent No. 2020-208182 filed on Dec. 16, 2020. The entire contents of this application are hereby incorporated herein by reference.

BACKGROUND OF THE INVENTION

1. Field of the Invention

The present disclosure relates to an alert notification device of a dental processing machine, an alert notification system, and a non-transitory recording medium storing a computer program for alert notification.

2. Description of the Related Art

JP 2015-120222A, for example, discloses a cutting machine that produces an object by cutting (also referred to as processing) a processing target made of a predetermined material such as ceramic or resin, into a desired shape. The cutting machine disclosed in JP 2015-120222A processes a processing target by using a rod-shaped processing tool with a blade portion and by changing relative positions of the processing target and the processing tool while rotating the processing tool about a center axis. Consequently, a desired object can be produced.

Examples of the cutting machine include a dental processing machine used in a dental field. While a processing target is processed by a dental processing machine, an error might occur in the dental processing machine. Errors of some types cannot be solved by a user of the dental processing machine in some cases. In such cases, the user contacts a maintenance company such as a call center. Thus, the maintenance company often knows of an occurrence of an error in a dental processing machine by contact from a user. While an error occurs, the dental processing machine cannot be used in some cases, which leads to a decrease in working efficiency.

SUMMARY OF THE INVENTION

Preferred embodiments of the present invention provide alert notification devices of dental processing machines each capable of notifying a maintenance company to perform maintenance of the dental processing machine of an alert when an error occurs in the dental processing machine, alert notification systems, and non-transitory recording media storing computer programs for alert notification.

An alert notification device of a dental processing machine according to a preferred embodiment of the present invention includes a receiver, a first extractor, and a notifier. The receiver receives error information from the dental processing machine. The first extractor extracts from the error information received by the receiver, as first extracted error information, error information that occurred in a predetermined first time. The notifier notifies a management device to be used by a maintenance company to perform maintenance of the dental processing machine, of an alert concerning the first extracted error information.

With the alert notification device of the dental processing machine, when an error occurs in the dental processing machine, error information regarding this error is received, and error information that occurred in a first time is extracted as first extracted error information. Then, a maintenance company is notified of an alert concerning the first extracted error information. The notification of the alert allows the maintenance company to know the type of the error that occurred in the dental processing machine. Accordingly, the maintenance company is able to know of the occurrence of the error in the dental processing machine more quickly without waiting for contact from a user of the dental processing machine.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Alert notification systems each including an alert notification device of a dental processing machine according to preferred embodiments of the present invention will be described with reference to the drawings. The preferred embodiments described are not intended to particularly limit the present invention.

Figure 1:
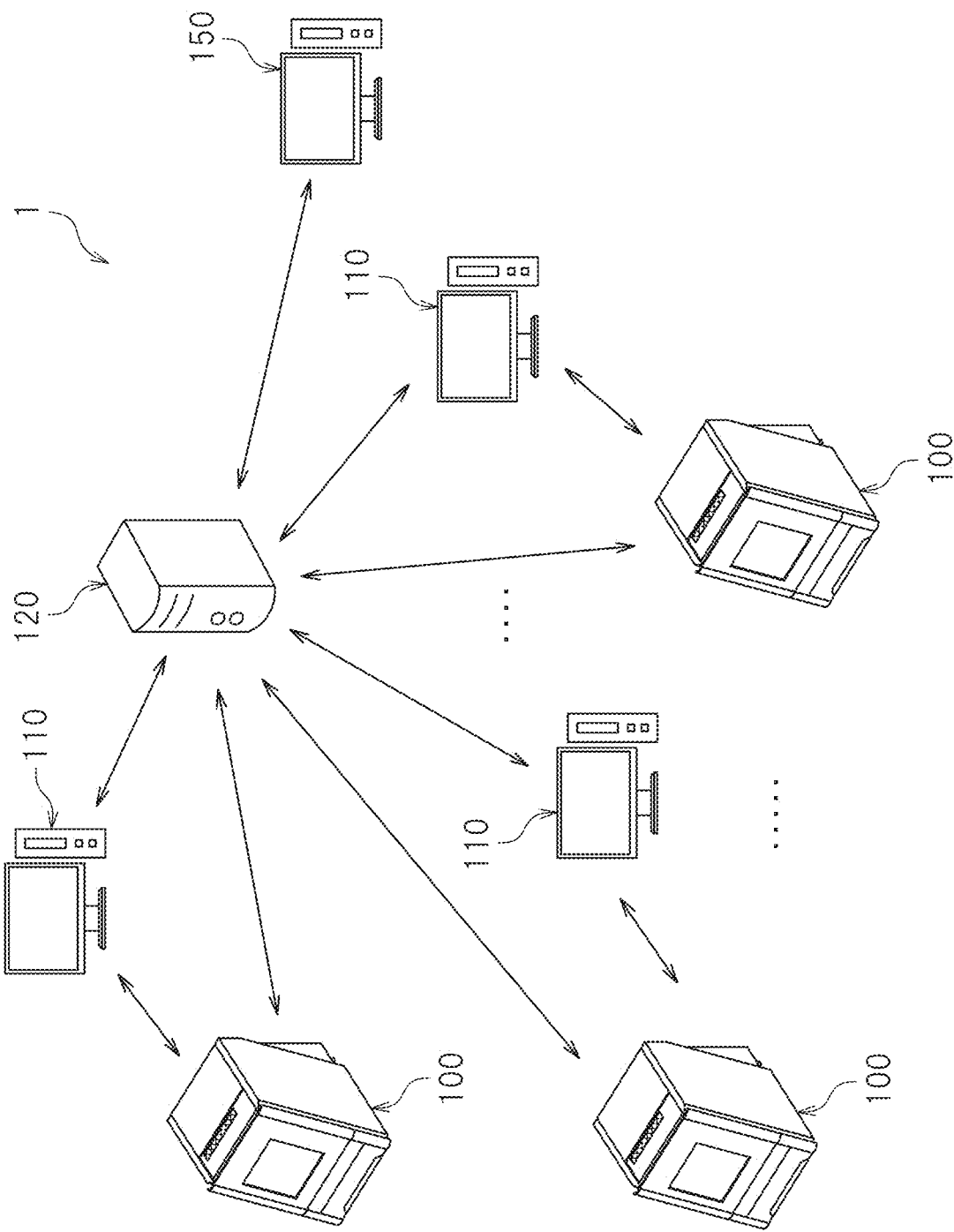
FIG. 1 is a conceptual view of an alert notification system according to a preferred embodiment of the present invention.

FIG. 1 is a conceptual view of an alert notification system 1 according to this preferred embodiment. The alert notification system 1 notifies a maintenance company described later of an alert concerning a dental processing machine 100 based on error information when an error occurs in the dental processing machine 100.

As illustrated in FIG. 1, the alert notification system according to this preferred embodiment includes dental processing machines 100, operation terminals 110, an alert notification device (hereinafter also referred to as an alert notification device) 120 for the dental processing machines, and a management device 150. The number of dental processing machines 100 according to this preferred embodiment is not specifically limited. The number of dental processing machines 100 may be one or more. Each of the operation terminals 110 is used when a user operates one or more corresponding dental processing machines 100. One or more dental processing machines 100 are communicably connected to each of the operation terminals 110. In this preferred embodiment, one operation terminal 110 is communicably connected to one dental processing machine 100, but a plurality of operation terminals 110 may be connected to one dental processing machine 100. The number of operation terminals 110 according to this preferred embodiment is not specifically limited.

The alert notification device 120 collectively manages information regarding the dental processing machines 100, and notifies the management device 150 of an alert when necessary. The plurality of dental processing machines 100 are communicably connected to the alert notification device 120. In this preferred embodiment, the plurality of operation terminals 110 are also communicably connected to the alert notification device 120, and the plurality of dental processing machines 100 are connected to the alert notification device 120 through the operation terminals 110. The number of alert notification devices 120 may be one or more.

The management device 150 is used by a maintenance company to perform maintenance of the dental processing machines 100, and is notified of an alert concerning the dental processing machines 100 from the alert notification device 120. The management device 150 herein is communicably connected to the alert notification device 120. The number of management devices 150 is not specifically limited. The number of management devices 150 may be one as in this preferred embodiment, or may be plural.

In this preferred embodiment, the alert notification system 1 may be implemented by a system of a client server type, or may be implemented by cloud computing. The dental processing machines 100, the operation terminals 110, the alert notification device 120, and the management device 150 will be described hereinafter in detail.

First, the dental processing machines 100 will be described. The plurality of dental processing machines 100 can be of different types. However, these dental processing machines 100 may have the same basic configuration. Thus, the basic configuration of the dental processing machines 100 will now be described.

Figure 2:
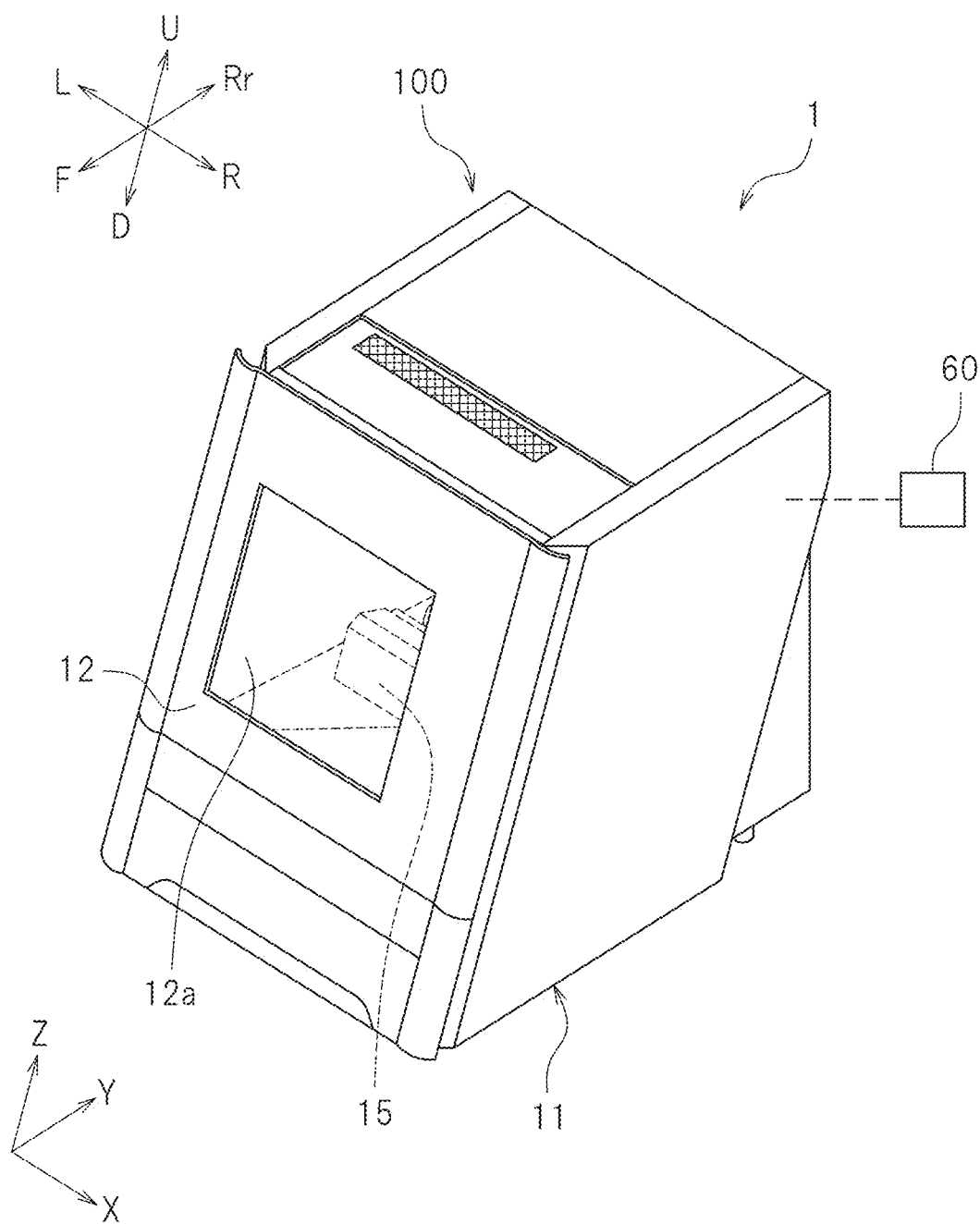
FIG. 2 is a perspective view of a dental processing machine.
Figure 3:
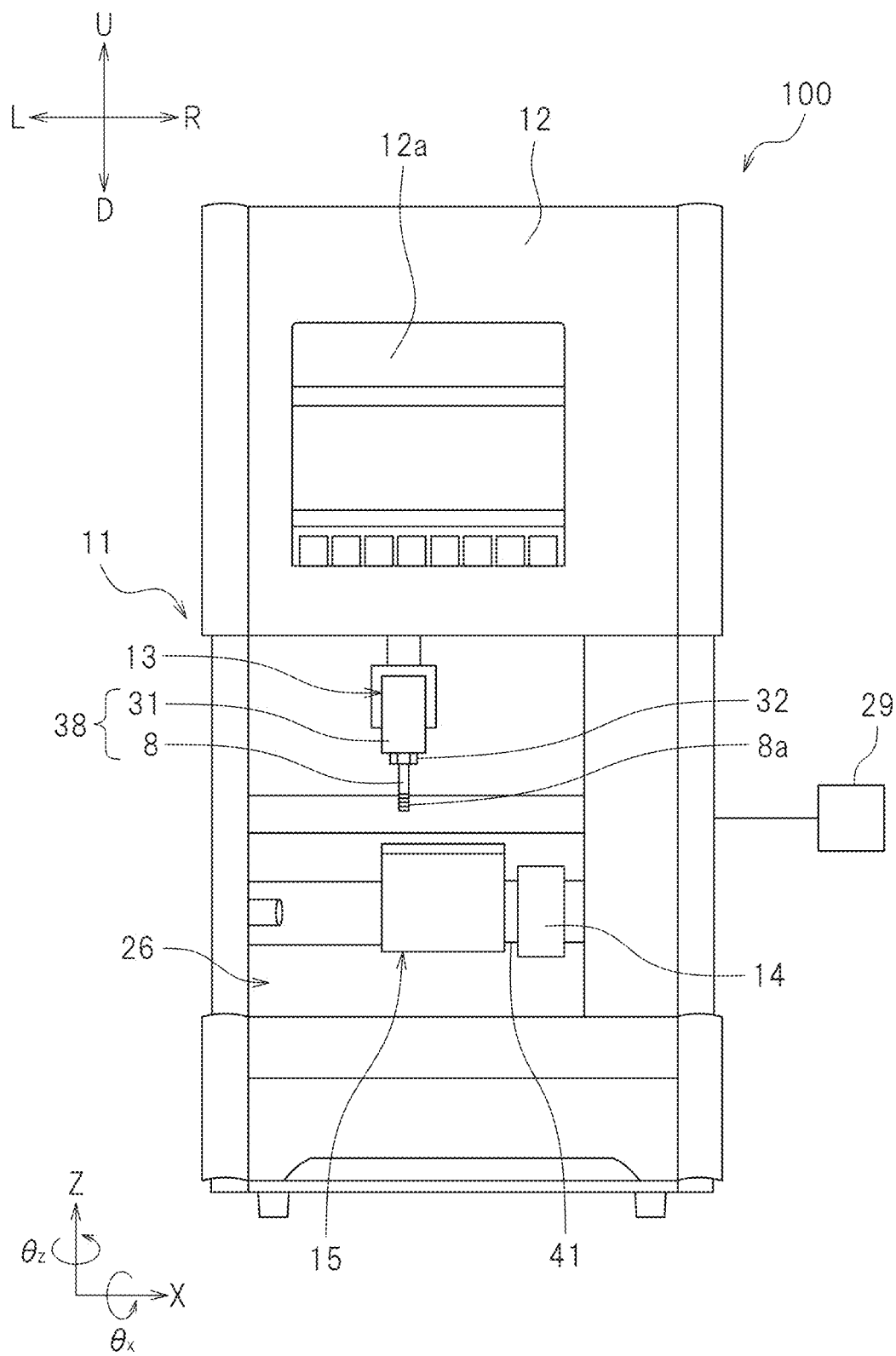
FIG. 3 is a front view of the dental processing machine and illustrates a state where a cover is open.
Figure 4:
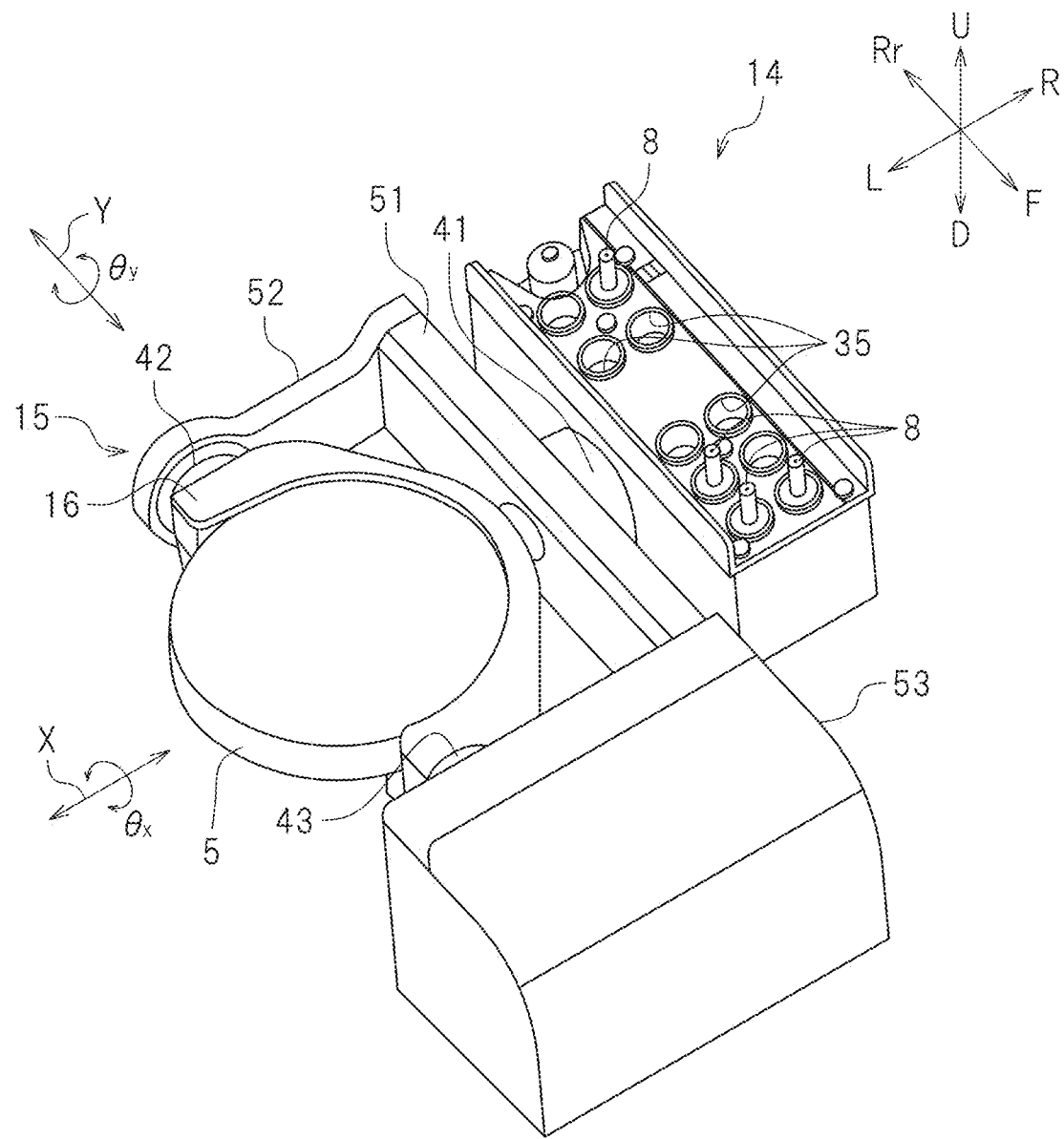
FIG. 4 is a perspective view of a tool magazine, a rotation support member, and a clamp.
Figure 5:
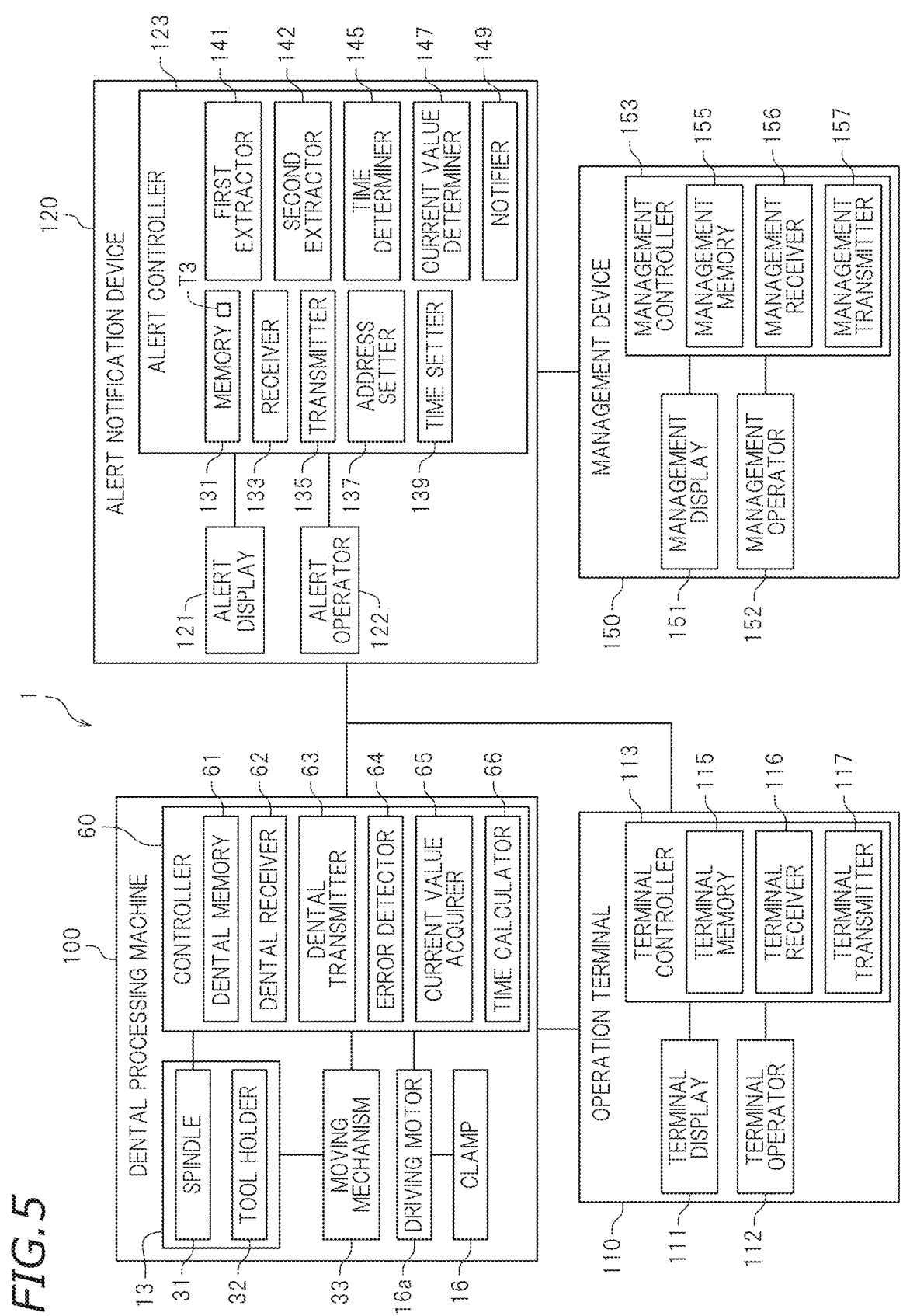
FIG. 5 is a block diagram of an alert notification system according to a preferred embodiment of the present invention.

FIG. 2 is a perspective view of the dental processing machine 100. FIG. 3 is a front view of the dental processing machine 100 and illustrates a state where a cover 12 is open. FIG. 4 is a perspective view of a tool magazine 14, a rotation support member 15, and a clamp 16 described later. FIG. 5 is a block diagram of the alert notification system 1 according to this preferred embodiment. In the following description, left and right respectively refer to left and right when seen from a user in front of the dental processing machine 100, that is, at a position facing the cover 12. A bottom surface of a processing chamber 26 (see FIG. 3) in a body 11 of the dental processing machine 100 is tilted downward from the front toward the back when seen from the user. In view of this, in this preferred embodiment, the direction away from the dental processing machine 100 along the bottom surface with respect to the user is defined as forward, and the direction toward the dental processing machine 100 along the bottom surface with respect to the user is defined as rearward. In a direction orthogonal to the bottom surface, the top is defined as the top of the dental processing machine 100, and the bottom is defined as the bottom of the dental processing machine 100. Characters F, Rr, L, R, U, and D in the drawings represent front, rear, left, right, up, and down, respectively.

In this preferred embodiment, supposing axes orthogonal to one another are defined as an X axis, a Y axis, and Z axis, the dental processing machine 100 is placed on a plane constituted by the X axis and the Y axis. For example, the X axis is an axis extending in the left-right direction, the Y axis is an axis extending in the front-rear direction, and the Z axis is an axis extending in the top-bottom direction. Characters θx, θy, and θz in the drawings refer to rotation directions about the X axis, the Y axis, and the Z axis, respectively. It should be noted that the directions described above are defined simply for convenience of description, and are not intended to limit the state of installation of the dental processing machine 100 and do not limit the present teaching.

The dental processing machine 100 produces an object by cutting a processing target 5 (see FIG. 4). The object herein is not limited to a specific type, and is, for example, a crown prosthetics. Examples of the crown prosthetics include an inlay, a crown, and a bridge. In this preferred embodiment, the dental processing machine 100 is a machine used in a dental field, and produces the crown prosthetics from the processing target 5.

The shape of the processing target 5 is, for example, a disc shape. The processing target 5 is made of, for example, zirconia, wax, polymethyl methacrylate (PMMA), hybrid resin, polyether ether ketone (PEEK), or gypsum. In a case where zirconia is used as a material for the processing target 5, semi-sintered zirconia is used, for example. The processing target 5, however, is not limited to a specific shape and a specific material.

As illustrated in FIG. 2, the dental processing machine 100 includes the body 11, the cover 12, a processing mechanism 13 (see FIG. 3), the tool magazine 14 (see FIG. 4), the rotation support member 15, and the clamp 16 (see FIG. 4). The body 11 has a box shape, and has space therein. This space is the processing chamber 26 (see FIG. 3). The processing chamber 26 is a space in which the processing target 5 is subjected to cutting. Although not shown specifically, the bottom surface of the processing chamber 26 is tilted downward from the front toward the rear as described above. The portion body 11 is open at the front. As illustrated in FIG. 3, the cover 12 is supported by the body 11 such that the opening of the body 11 is freely opened and closed. The cover 12 has a window 12a. The user can visually recognize the processing chamber 26 in the body 11 through the window 12a.

As illustrated in FIG. 3, the processing mechanism 13 is used to cut the processing target 5 with a processing tool 8. The processing mechanism 13 brings the processing tool 8 into contact with the processing target 5 while rotating the processing tool 8 to process the processing target 5. The processing mechanism 13 includes a spindle 31 and a tool holder 32. The spindle 31 and the tool holder 32 are disposed in the processing chamber 26 of the body 11. The spindle 31 rotates the tool holder 32 and the rod-shaped processing tool 8 held by the tool holder 32 about the center axis of the processing tool 8. The spindle 31 is replaceable with respect to the body 11. The spindle 31 extends in the top-bottom direction, and is rotatable about the Z axis in the θz direction.

The tool holder 32 holds the processing tool 8, and is provided on the spindle 31. Specifically, the tool holder 32 is provided on the bottom surface of the spindle 31. The tool holder 32 is replaceable with respect to the body 11. The tool holder 32 selectively holds one of a plurality of processing tools 8. When the spindle 31 rotates about the Z axis in the θz direction, the tool holder 32 and the processing tool 8 held by the tool holder 32 rotates about the Z axis n the θz direction, that is, about the center axis of the processing tool 8.

In this preferred embodiment, a plurality of processing tools 8 are held by the tool holder 32. Each of the processing tools 8 has a rod shape, and has a blade portion 8a in a lower portion thereof. The plurality of processing tools 8 including the blade portions 8a of different shapes are prepared beforehand. During processing, the processing tool 8 held by the tool holders 32 is replaced by another processing tool 8 when necessary.

In this preferred embodiment, the spindle 31 and the processing tools 8 are consumable, and replaced after use in a predetermined time, or a predetermined number of times. Parts that are replaced after use in a certain period or times, such as spindles 31 and processing tools 8, will be referred to as replacement parts 38. The replacement parts 38 are recommended to be replaced after a lapse of a predetermined reference use time T5 (see FIG. 15), and are included in the dental processing machine 100.

In this preferred embodiment, the spindles 31 and the processing tools 8 are used as examples of the replacement parts 38, but the replacement parts 38 are not limited to the spindles and the processing tools 8. The replacement parts 38 can include parts that are recommended to be replaced after a lapse of the reference use time T5, as well as the spindles 31 and the processing tools 8. The reference use time T5 herein is a concept, and a specific reference use time T5 cannot be always the same for all the parts such as the spindles 31 and the processing tools 8 included in the replacement parts 38. That is, the reference use time T5 is set for each part included in the replacement parts 38, and different times may be set for individual parts included in the replacement parts 38. The reference use time T5 of the spindles 31 included in the replacement parts 38, for example, is approximately 2,000 hours, and the reference use time T5 of the processing tools 8 included in the replacement parts 38 is approximately 10 hours to 20 hours.

In this preferred embodiment, as shown in FIG. 5, the dental processing machine 100 includes a moving mechanism 33. The moving mechanism 33 is a mechanism to move the processing mechanism (specifically, the spindles 31 and the tool holders 32). The moving mechanism 33 moves the processing mechanism 13 in the left-right direction and in the top-bottom direction. The moving mechanism 33 is not limited to a specific configuration. For example, the moving mechanism 33 may include a motor, and the processing mechanism 13 may be caused to move by driving the motor.

As illustrated in FIG. 4, the tool magazine 14 can accommodate a plurality of processing tools 8. In this preferred embodiment, the tool magazine 14 has a box shape. The upper surface of the tool magazine 14 has a plurality of accommodation holes 35 to accommodate the processing tools 8. Each processing tool 8 is inserted in a corresponding one of the accommodation holes 35 with an upper portion of the processing tool 8 exposed. The number of the accommodation holes 35 is not specifically limited, and is 10 in this example. Thus, in this preferred embodiment, the tool magazine 14 can accommodate 10 processing tools 8. In replacing the processing tools 8 held by the tool holder 32, the processing tools 8 held by the tool holder 32 are returned to the accommodation holes 35. Then, the processing mechanism 13 is moved to a position above the processing tool 8 to be used next. Thereafter, the tool holder 32 holds the upper end of the processing tool 8 located under the tool holder 32.

In this preferred embodiment, as illustrated in FIG. 4, the tool magazine 14 includes a first rotation shaft 41 rotatably supporting the rotation support member 15. The first rotation shaft 41 extends in the left-right direction, and is coupled to the rotation support member 15. Although not shown, the tool magazine 14 includes a driving mechanism to rotate the first rotation shaft 41. The first rotation shaft 41 is rotatable about the X axis in the θx direction by the driving mechanism. Rotation of the first rotation shaft 41 about the X axis in the θx direction causes the rotation support member 15 to rotate about the X axis in the θx direction.

The rotation support member 15 rotatably supports the clamp 16. The rotation support member 15 has a substantially C shape in plan view. The rotation support member 15 is coupled to the tool magazine 14 through the first rotation shaft 41. The rotation support member 15 includes a first part 51, a second part 52, and a third part 53. The first part 51 is located at the left of the tool magazine 14, and extends in the front-rear direction. The second part 52 extends leftward from the rear end of the first part 51. The third part 53 extends leftward from the front end of the first part 51. The third part 53 is opposed to the second part 52. In this preferred embodiment, the clamp 16 is disposed between the second part 52 and the third part 53.

The clamp 16 supports the processing target 5 in processing the processing target 5. In this preferred embodiment, an adaptor (not shown) is attached to the processing target 5, and the clamp 16 supports the processing target 5 through the adaptor. For example, the clamp 16 has a shape corresponding to a portion of the shape of the processing target 5. The clamp 16 herein has a substantially C shape in plan view. The clamp 16 is rotatably supported by the second part 52 and the third part 53 of the rotation support member 15. One end of the second rotation shaft 42 is connected to a rear portion of the clamp 16, and the second part 52 is connected to the other end of the second rotation shaft 42. One end of a third rotation shaft 43 is connected to a front portion of the clamp 16, and the third part 53 is connected to the other end of the third rotation shaft 43. In this preferred embodiment, the third part 53 is provided with a driving motor 16a (see FIG. 5) to cause the clamp 16 to rotate about the Y axis in the θy direction.

The dental processing machine 100 according to this preferred embodiment may be a dental processing machine including a so-called disc changer. The disc changer in this case may be a known disc changer. As the disc changer, a processing target conveyor described in JP2018-89763A can be used.

As illustrated in FIG. 2, the dental processing machine 100 includes a controller 60. The controller 60 is configured or programmed to perform control concerning processing of the processing target 5. The controller 60 may include a microcomputer and provided in the body 11. The controller 60 includes a central processing unit (CPU), a ROM storing, for example, programs to be executed by the CPU, a RAM, and so forth. The controller 60 is configured or programmed to perform control concerning processing on the processing target 5 by using a program stored in the microcomputer.

As shown in FIG. 5, the controller 60 is communicably connected to the spindle 31, and controls rotation of the spindle 31. The controller 60 is communicably connected to the driving motor 16a to rotate the clamp 16 about the Y axis in the θy direction, and controls the driving motor 16a. The controller 60 is communicably connected to the moving mechanism 33 to move the processing mechanism 13 in the left-right direction and in the top-bottom direction, and controls the moving mechanism 33. Although not shown, the controller 60 is communicably connected to the driving mechanism to rotate the first rotation shaft 41, and control the driving mechanism.

In this preferred embodiment, as illustrated in FIG. 5, the controller 60 includes a dental memory 61, a dental receiver 62, a dental transmitter 63, an error detector 64, a current value acquirer 65, and a time calculator 66. The dental receiver 62 is configured or programmed to receive various types of information from the operation terminal 110 and the alert notification device 120. The dental transmitter 63 is configured or programmed to transmit various types of information (e.g., error information E1 (see FIG. 7)) to the operation terminal 110 and the alert notification device 120. The error detector 64 is configured or programmed to detect an error of the dental processing machine 100 generated during processing of the processing target 5. The current value acquirer 65 is configured or programmed to acquire a spindle current value A1 (see FIG. 14) that is a value of a current flowing in the spindle 31. The time calculator 66 is configured or programmed to calculate a use time T6 (see FIG. 15) in which the replacement part 38 such as the processing tool 8 or the spindle 31 was actually used.

Next, the operation terminal 110 illustrated in FIG. 1 will be described. In this preferred embodiment, the plurality of operation terminals 110 preferably have the same configuration, for example. Thus, the following description is directed to the configuration of one operation terminal 110. The operation terminal 110 is used to operate the dental processing machine 100. The operation terminal 110 is implemented by, for example, a personal computer. The operation terminal 110 may be implemented by a general-purpose computer or a dedicated computer.

As illustrated in FIG. 1, the dental processing machine 100 is communicably connected to the operation terminal 110. The operation terminal 110 can operate the dental processing machine 100 communicably connected to the operation terminal 110. As shown in FIG. 5, the operation terminal 110 includes, for example, a terminal display 111, a terminal operator 112, and a terminal controller 113.

The terminal display 111 is not limited to a specific type, and is, for example, a display of a desktop personal computer or a notebook personal computer (i.e., a laptop computer). The terminal operator 112 is, for example, a keyboard or a mouse of a personal computer. The terminal operator 112 may be a touch panel provided on the terminal display 111.

The terminal controller 113 is, for example, a microcomputer. A hardware architecture of the microcomputer is not specifically limited, and includes a CPU, a ROM, a RAM, a memory device, and so forth. The terminal controller 113 is communicably connected to the terminal display 111 and the terminal operator 112. The terminal controller 113 is also communicably connected to the controller 60 of the dental processing machine 100.

A dedicated application to operate the dental processing machine 100 is installed in the terminal controller 113. A user operates the terminal operator 112 to display the application on the terminal display 111, and operates the application through the terminal operator 112 to operate the dental processing machine 100.

As shown in FIG. 5, the terminal controller 113 includes a terminal memory 115, a terminal receiver 116, and a terminal transmitter 117. The terminal receiver 116 is configured or programmed to receive, for example, various types of information from the dental processing machine 100 and the alert notification device 120. The terminal transmitter 117 is configured or programmed to transmit, for example, various types of information to the dental processing machine 100 and the alert notification device 120.

Thereafter, the alert notification device 120 illustrated in FIG. 1 will be described. The alert notification device 120 notifies the management device 150 of an alert when a failure occurs in the dental processing machine 100 or when a situation where a failure can occur is likely to occur. Examples of the failure in the dental processing machine 100 herein include the occurrence of an error in the dental processing machine 100 and the occurrence of a need for maintenance to the dental processing machine 100.

For example, in a case where the alert notification system 1 is a system of a client server type, the alert notification device 120 functions as a server. On the other hand, in a case where the alert notification system 1 is implemented by cloud computing, the alert notification device 120 functions as a cloud.

In this preferred embodiment, as shown in FIG. 5, the alert notification device 120 includes an alert display 121, an alert operator 122, and an alert controller 123. The alert display 121 is, for example, a desktop display defining a server. The alert operator 122 is, for example, a keyboard and a mouse of a personal computer defining the server.

The alert controller 123 is, for example, a microcomputer. The alert controller 123 includes a CPU, a ROM, a RAM, and so forth. The alert controller 123 is communicably connected to the alert display 121 and the alert operator 122. The alert controller 123 is also communicably connected to the controller 60 of the dental processing machine 100 and the terminal controller 113 of the operation terminal 110. A detailed configuration of the alert controller 123 will be described later.

The management device 150 illustrated in FIG. 1 is used to manage the dental processing machine 100. In this preferred embodiment, the management device 150 is used when a maintenance company manages the dental processing machine 100, for example. The maintenance company herein refers to a company in charge of maintenance of the dental processing machine 100. The maintenance company can be a manufacturer of the dental processing machine 100. The maintenance company may be a so-called call center.

The management device 150 is implemented by, for example, a personal computer. The management device 150 may be implemented by a general-purpose computer or a dedicated computer. The management device 150 may be a portable terminal such as a so-called smartphone or a tablet personal computer.

As shown in FIG. 5, the management device 150 includes a management display 151, a management operator 152, and a management controller 153. The management display 151 is, for example, a display of a desktop personal computer, a notebook personal computer (i.e., a laptop computer), or a portable terminal. The management operator 152 is, for example, a keyboard and a mouse of a personal computer. The management operator 152 may be a touch panel provided on the management display 151.

The management controller 153 is, for example, a microcomputer. The management controller 153 includes a CPU, a ROM, a RAM, and so forth. The management controller 153 is communicably connected to the management display 151 and the management operator 152. The management controller 153 is also communicably connected to the alert controller 123 of the alert notification device 120.

The management controller 153 includes a management memory 155, a management receiver 156, and a management transmitter 157. The management receiver 156 is configured or programmed to receive various types of information from the alert notification device 120 (e.g., an alert notified from the alert notification device 120). The management transmitter 157 is configured or programmed to transmit various types of information to the alert notification device 120 and other devices.

In the dental processing machine 100, an error can occur in processing the processing target 5. In a case where a user can solve an error that occurred in the dental processing machine 100, the user can continuously use the dental processing machine 100 by solving the error. However, if the user cannot solve the error, the user contacts the maintenance company. Thereafter, the maintenance company comes to the place where the dental processing machine 100 is located, and performs maintenance of the dental processing machine 100 to solve the error. In this manner, in a conventional technique, when an error occurs in the dental processing machine 100, the maintenance company sometimes knows of the occurrence of the error when being notified of the error by the user. Thus, a time lag occurs from when the error occurred in the dental processing machine 100 to when the maintenance company was notified of the occurrence of the error. In view of this, this preferred embodiment provides a system to automatically notify a maintenance company of an alert concerning an error that occurred in the dental processing machine 100 so as to reduce or eliminate the time lag.

In this preferred embodiment, as shown in FIG. 5, the alert controller 123 of the alert notification device 120 is configured or programmed to include a memory 131, a receiver 133, a transmitter 135, an address setter 137, a time setter 139, a first extractor 141, a second extractor 142, a time determiner 145, a current value determiner 147, and a notifier 149 in order to notify the maintenance company of an alert concerning an error that occurred in the dental processing machine 100. Each component of the alert controller 123 may be constituted by software or hardware. Each component of the alert controller 123 may be implemented by one or more processors, or may be implemented in a circuit. Specific control and processes of the components of the alert controller 123 will be described later.

A procedure of notifying the management device 150 of an alert from the alert notification device 120 will now be described. First, a series of steps of notification of an alert when an error occurs in the dental processing machine 100 will be described with reference to the flowchart of FIG. 6. In this preferred embodiment, when an error occurs in the dental processing machine 100, the alert notification device 120 receives error information E1, described later, concerning the error. Subsequently, based on the received error information E1, the alert notification device 120 notifies a maintenance company of an alert when necessary. In this example, the maintenance company is notified of the alert by notifying the management device 150 of the alert.

Figure 6:
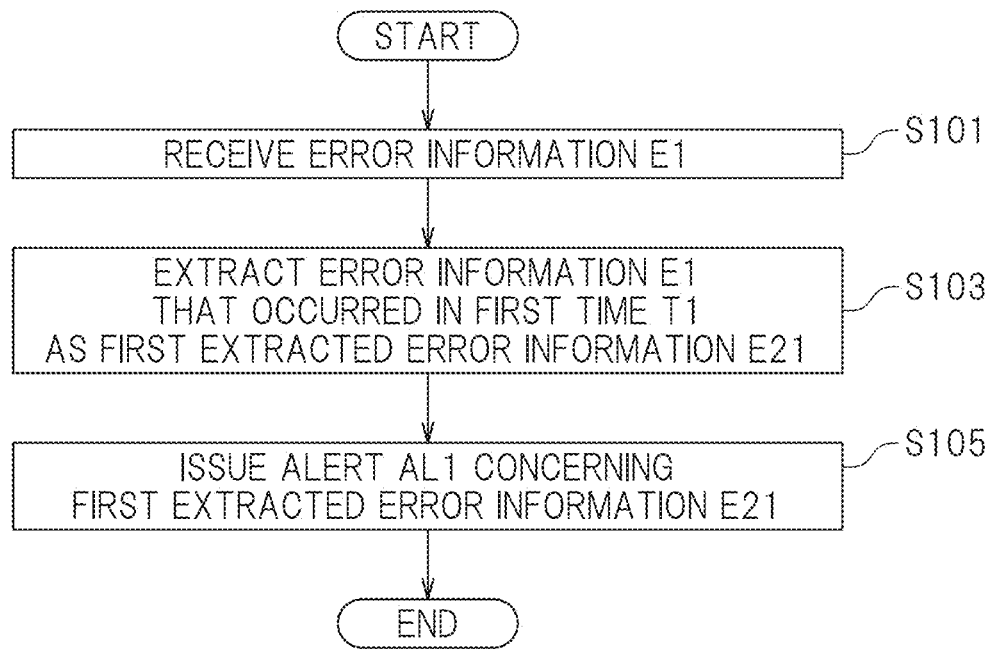
FIG. 6 is a flowchart depicting a procedure of notification of an alert concerning first extracted error information from an alert notification device to a management device.

In this preferred embodiment, in step S101 of FIG. 6, the receiver 133 of the alert notification device 120 receives error information E1 from the dental processing machine 100. Before step S101, the following control is performed in the dental processing machine 100.

First, an error occurs in the dental processing machine 100. When an error occurs, the error detector 64 (see FIG. 5) of the dental processing machine 100 detects an error that occurred in the dental processing machine 100. The error occurring in the dental processing machine 100 is not limited to a specific type, and includes an error known to date. An error occurs when the processing target 5 is not appropriately processed. Examples of the error include an error caused by breakage of the processing tool 8, an error caused by a failure in holding the processing tool 8 by the tool holder 32, an error caused by a failure in rotating the spindle 31 at an appropriate rotation speed in a unit time, an error caused by a failure in moving the processing mechanism 13 or the clamp 16 to an appropriate position, and an error caused by replacement of the processing targets 5 by the disc changer in the dental processing machine including the disc changer. The error detector 64 detects these errors through, for example, unillustrated sensors.

After an error in the dental processing machine 100 has been detected by the error detector 64 as described above, the dental transmitter 63 (see FIG. 5) of the dental processing machine 100 transmits error information E1 regarding the error that occurred in the dental processing machine 100 to the alert notification device 120. The dental transmitter 63 may transmit the error information E1 to the operation terminal 110 as well as the alert notification device 120.

Figure 7:
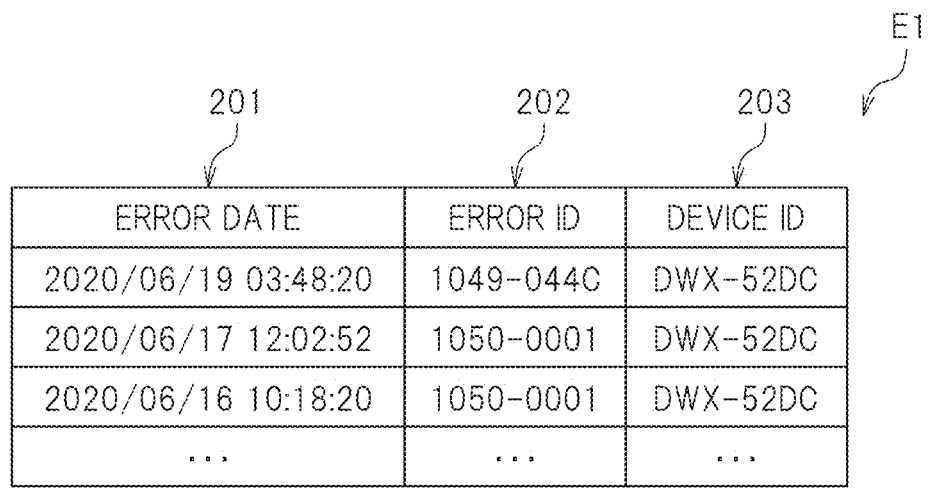
FIG. 7 is a table showing an example of error information.

Items included in the error information E1 are not specifically limited. FIG. 7 shows an example of the error information E1. In this preferred embodiment, the error information E1 includes an error date 201, an error ID 202, and a device ID 203. The error date 201 is a date and a point in time when an error occurred in the dental processing machine 100. Specifically, the error date 201 refers to a date and a point in time when the error detector 64 of the dental processing machine 100 detected an error. The error date 201 may be a date when the alert notification device 120 received the error information E1.

The error ID 202 uniquely specifies the type of an error. The error ID 202 is an ID uniquely assigned to the type of an error. The maintenance company is able to know the type of an error that occurred in the dental processing machine 100, based on the error ID 202. Although not specifically shown, a list of error IDs 202, for example, are stored in the dental memory 61 (see FIG. 5) of the dental processing machine 100. When the error detector 64 detects an error, the list of errors ID 202 is referred to, and an error ID 202 corresponding to the error detected by the error detector 64 is transmitted to the alert notification device 120. The device ID 203 is an ID uniquely assigned to each dental processing machine 100. From the device ID 203, the dental processing machine 100 can be uniquely specified.

As described above, when the error information E1 is transmitted from the dental transmitter 63 of the dental processing machine 100, in step S101 of FIG. 6, the receiver 133 of the alert notification device 120 receives the error information E1 transmitted from the dental processing machine 100. The error information E1 received by the receiver 133 is stored in the memory 131.

Then, in step S103, the first extractor 141 shown in FIG. extracts, as first extracted error information E21, error information E1 that occurred in a first time T1 from the error information E1 received by the receiver 133. Then, in step S105, the notifier 149 shown of FIG. 5 issues an alert AL1 concerning the first extracted error information E21. As described above, in this preferred embodiment, the management device 150 is notified of the alert AL1 concerning the error information E1 (first extracted error information E21) that occurred in the first time T1 set beforehand. The first time T1 corresponds to a monitoring time in the example of FIG. 8. The monitoring time is a period from the current to the past for which the maintenance company wants to know whether an error occurred in the dental processing machine 100. The first time T1 is stored in the memory 131 (see FIG. 5) of the alert notification device 120. The first time T1 may be set beforehand, or may be set by the maintenance company.

Figure 9:
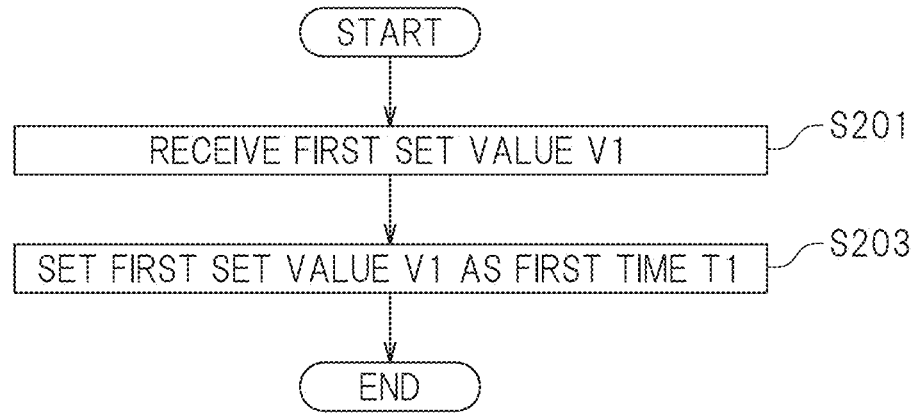
FIG. 9 is a flowchart depicting a control procedure of the alert notification device in setting a first time by a maintenance company.

FIG. 9 is a flowchart depicting a control procedure of the alert notification device 120 in setting the first time T1 by the maintenance company. In the case where the first time T1 is set by the maintenance company, a time setting screen (not shown) is displayed on the management display 151 (see FIG. 5) of the management device 150, for example. The maintenance company operates the management operator 152, and inputs a first set value V1 intended to be set as the first time T1 (see step S201 in FIG. 9). When the input of the first set value V1 is completed, the management transmitter 157 illustrated in FIG. 5 transmits the first set value V1 to the alert notification device 120. Subsequently, in step S201 of FIG. 9, the receiver 133 of the alert notification device 120 receives the first set value V1 from the management device 150. Thereafter, in step S203, the time setter 139 (see FIG. 5) of the alert notification device 120 sets the first set value V1 as the first time T1. The first time T1 set at the first set value V1 is stored in the memory 131.

The first time T1 is intended to vary depending on, for example, the type of the error information E1 in some cases. For example, with respect to error information E1 with a high frequency of occurrences of errors, the first time T1 is reduced, whereas with respect to error information E1 with a low frequency of occurrences of errors, the first time T1 is increased in some cases. The time setter 139 may set the first time T1 as a monitoring time for each type of the error information E1. The type of the error information E1 herein refers to the type of the error ID 202 (see FIG. 7). That is, pieces of the error information E1 with different error IDs 202 are assumed to be of different types.

In a case where the first time T1 is set for each type of the error information E1, the time setting screen displayed on the management display 151 may be configured such that the first set value V1 can be set for each type of the error information E1. The first set value V1 set for each type of the error information E1 is transmitted to the alert notification device 120. The time setter 139 sets the first set value V1 as the first time T1 for each type of the error information E1.

The first time T1 is not limited to a specific time. For example, the first time T1 may be in units of months, weeks, or days, or may be in units of hours, minutes, or seconds. Alternatively, zero may be set as the first time T1. In the case where zero is set as the first time T1, an alert AL1 is issued each time an error in the dental processing machine 100 is detected by the error detector 64. That is, in this case, the alert AL1 is issued in real time of an error occurrence each time an error in the dental processing machine 100 is detected by the error detector 64.

Figure 10:
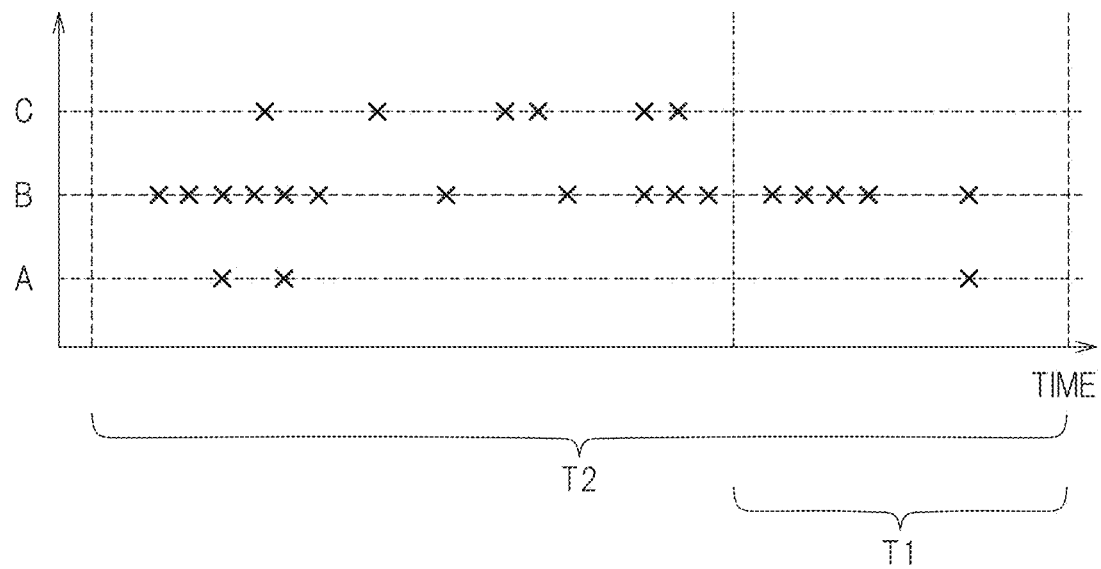
FIG. 10 shows an example of the types of errors that occurred in the first time and a second time.

In this preferred embodiment, as described above, in step S105 of FIG. 6, the management device 150 is notified of the alert AL1 concerning the error information E1 (first extracted error information E21) that occurred in the first time T1. For this notification, in step S103, the first extractor 141 of the alert notification device 120 extracts, as first extracted error information E21, error information E1 that occurred in the first time T1 from the error information E1 received by the receiver 133. FIG. 10 shows examples of types A, B, and C of errors that occurred in the first time T1 and the second time T2. In FIG. 10, the abscissa represents time, and "x" represents the occurrence of an error. In the example of FIG. 10, errors of the types A and B occur and an error of the type C does not occur in the first time T1. In this case, the first extractor 141 extracts error information E1 concerning the types A and B as first extracted error information E21, and does not extract error information E1 concerning the type C as first extracted error information E21.

Figure 8:
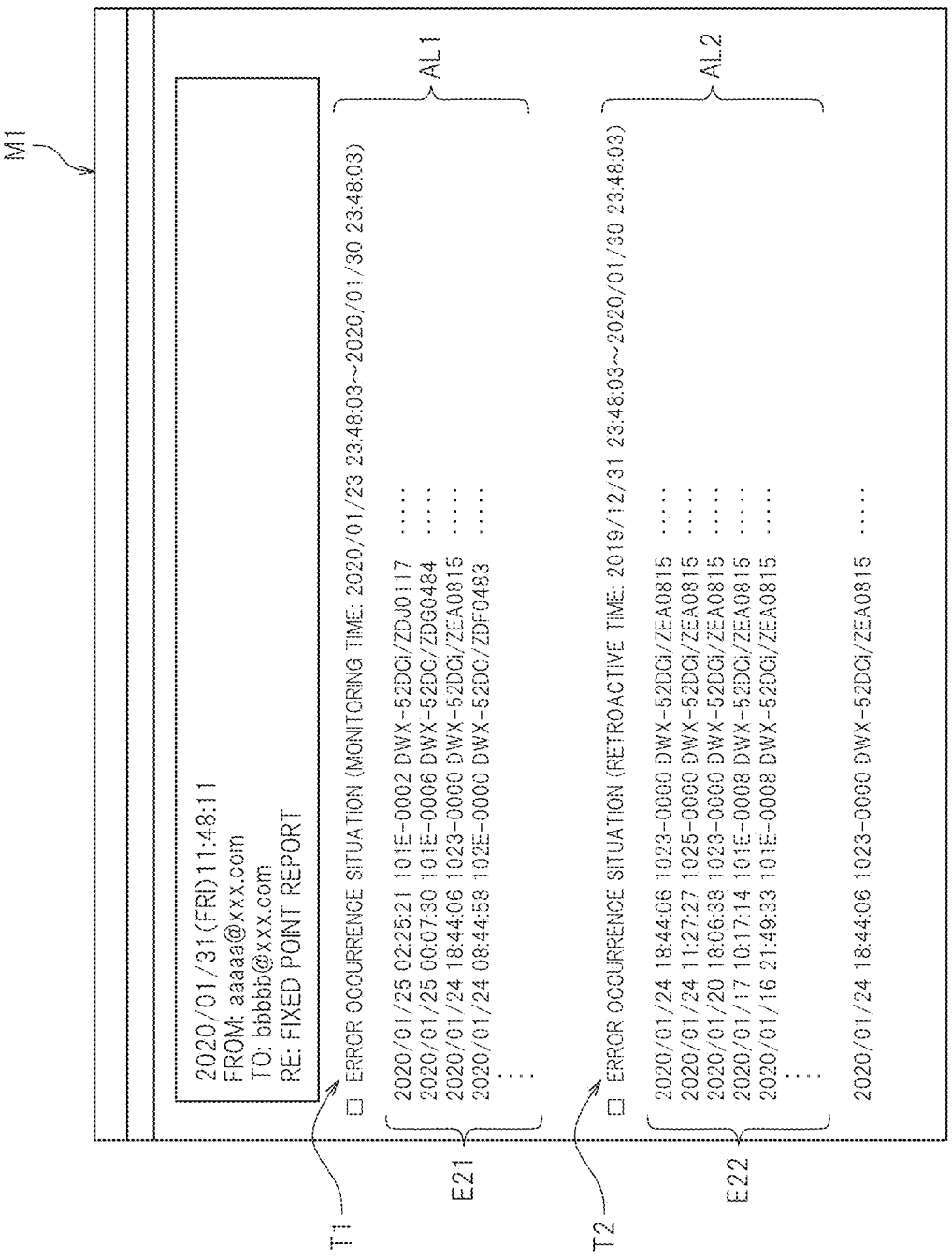
FIG. 8 shows an example of an email notifying of an alert concerning error information.

In the manner described above, after the first extracted error information E21 is extracted in step S103 of FIG. 6, the notifier 149 of the alert notification device 120 notifies the management device 150 of an alert AL1 concerning the first extracted error information E21 in step S105. The method for notifying the management device 150 of the alert AL1 herein is not specifically limited. In this preferred embodiment, the notifier 149 notifies an email address previously set in the management device 150 of the alert AL1 by an email M1 as shown in FIG. 8. The "notification of an alert" in this preferred embodiment refers to display of information regarding, for example, a corresponding error (e.g., first extracted error information E21).

In this preferred embodiment, an email address to be notified of the alert AL1 is set by the address setter 137 shown in FIG. 5. The address setter 137 of the alert notification device 120 may set the same email address to all the types of first extracted error information E21 as email addresses to be notified, or may set different email addresses for individual types of the first extracted error information E21. The address setter 137 may set the same email address to a plurality of dental processing machines 100 as email addresses to be notified, or may set different email addresses for the individual dental processing machines 100. In a case where a plurality of users use the dental processing machine 100 as a target of the maintenance company, the address setter 137 may set different email addresses for the individual users.

In this preferred embodiment, an email address to be notified of the alert AL1 by the notifier 149 may be set by the maintenance company. In the case where the maintenance company sets an email address to be notified of the alert AL1, an email address setting screen (not shown) is first displayed on the management display 151 (see FIG. 5) of the management device 150. The maintenance company operates the management operator 152 and inputs a set email address to the email address setting screen. When the input of the set email address is completed, the management transmitter 157 transmits the set email address to the alert notification device 120. The receiver 133 of the alert notification device 120 receives the set email address. Thereafter, the address setter 137 of the alert notification device 120 sets the set email address as an email address to be notified of an alert AL1.

In this preferred embodiment, the timing of notification of the alert AL1 by the notifier 149 is not specifically limited.

The notifier 149 herein issues the alert AL1 at a time when a predetermined notification time T3 (see FIG. 5) has elapsed from notification of a previous alert AL1. As shown in FIG. 5, the notification time T3 is stored in the memory 131. The notification time T3 may be previously set or may be set by the maintenance company. The notification time T3 is, for example, 12 hours or 24 hours. In the case where the notification time T3 is 12 hours, for example, an email of alert notification is issued twice a day. In the case where the notification time T3 is 24 hours, for example, an email of alert notification is issued once a day at an intended point in time.

Figure 11:
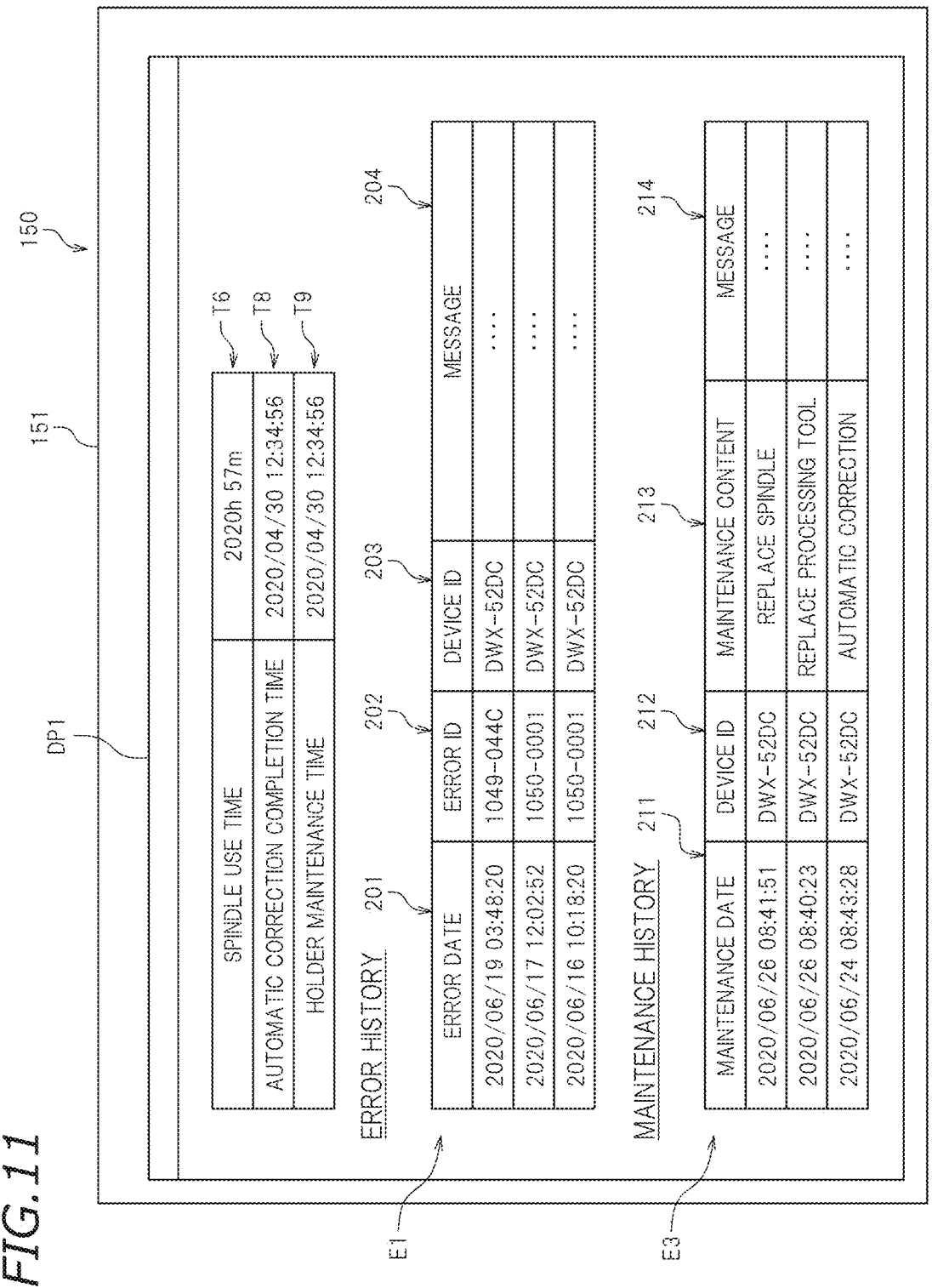
FIG. 11 shows an example of a management screen displayed on a management display of a management device.

FIG. 11 shows an example of a management screen DP1 displayed on the management display 151 of the management device 150. In this preferred embodiment, as shown in FIG. 11, the management screen DP1 is displayed on the management display 151. The management screen DP1 displays an error history and a maintenance history. The maintenance company is able to know the date of an occurrence of an error in the dental processing machine 100 and the date of maintenance by seeing the management screen DP1. In this preferred embodiment, in step S101 of FIG. 6, for example, when the alert notification device 120 receives error information E1, the transmitter 135 of the alert notification device 120 transmits error information E1 to the management device 150. Thereafter, as shown in FIG. 11, the management controller 153 of the management device 150 displays the error information E1 as an error history on the management screen DP1. As the error history in FIG. 11, a message 204 may be displayed. The message 204 includes, for example, a specific content of an error to the error ID 202. The message 204 may include a specific method for solving an error to the error ID 202.

The foregoing description is directed to the procedure of notification of the alert AL1 concerning the error information E1 (first extracted error information E21 in this example) of an error that occurred in the dental processing machine 100 in the monitoring time as the first time T1. Alternatively, an alert AL2 (see FIG. 8) concerning error information E1 of an error that occurred in the second time T2 different from the first time T1 may be issued. As shown in FIG. 10, the second time T2 is a time from the current to the past, in a manner similar to the first time T1 as the monitoring time. The second time T2 is longer than the first time T1. The second time T2 partially overlaps the first time T1. The second time T2 corresponds to a retroactive time in the example of FIG. 8. In this example, the alert notification device 120 issues an alert AL2 (see FIG. 8) concerning the type of the error information E1 that occurred a predetermined reference number of times (predetermined reference number of occurrences) C2 (see FIG. 12) in the second time T2 as a retroactive time among the types of errors that occurred in the monitoring time (first time T1).

A procedure of notification of the alert AL2 will now be described with reference to the flowchart of FIG. 12. In step S301 of FIG. 12, in a manner similar to that in step S101 of FIG. 6, the receiver 133 of the alert notification device 120 receives error information E1 from the dental processing machine 100. Next, in step S303, in a manner similar to that in step S103 of FIG. 6, the first extractor 141 of the alert notification device 120 extracts, as first extracted error information E21, the type of the error information E1 that occurred in the first time T1 from the error information E1 received by the receiver 133. Thereafter, in step S305, the second extractor 142 (see FIG. 5) of the alert notification device 120 extracts, as second extracted error information E22, first extracted error information E21 that occurred the reference number of times C2 in the second time T2.

In this preferred embodiment, the second time T2 and the reference number of occurrences C2 are stored in the memory 131 of the alert notification device 120. The second time T2 and the reference number of occurrences C2 may be set beforehand, or may be set by the maintenance company.

Figure 13:
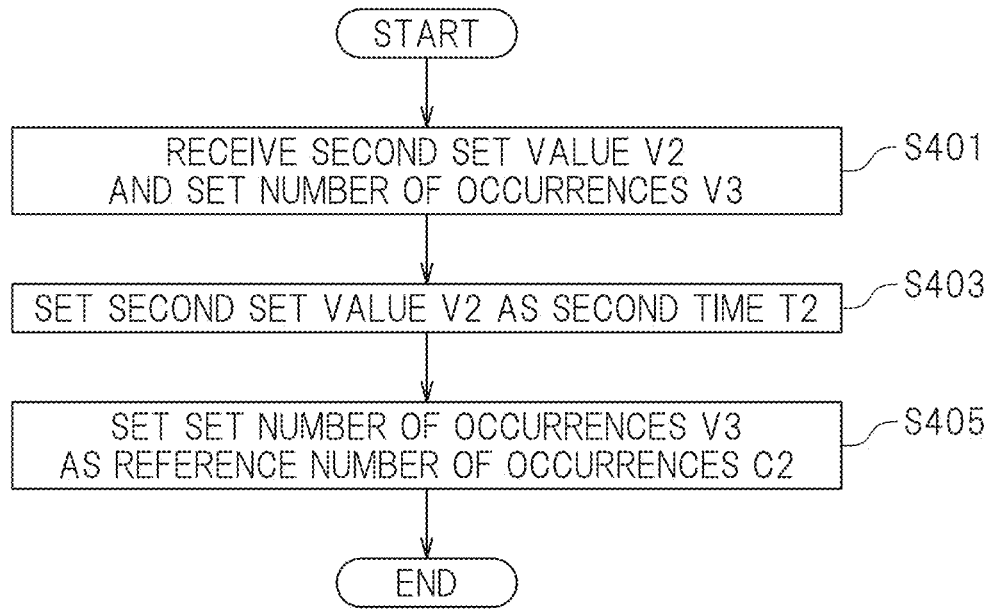
FIG. 13 is a flowchart depicting a control procedure of the alert notification device in setting the second time and a reference number of occurrences by the maintenance company.

FIG. 13 is a flowchart depicting a control procedure of the alert notification device 120 in setting the second time T2 and the reference number of occurrences C2 by the maintenance company. In the case where the second time T2 and the reference number of occurrences C2 are set by the maintenance company, a time number setting screen (not shown) is displayed on the management display 151 (see FIG. 5), for example. In this case, the maintenance company operates the management operator 152 and inputs a second set value V2 as the second time T2 and a set number of occurrences V3 as the reference number of occurrences C2. Thereafter, the management transmitter 157 in FIG. 5 transmits the second set value V2 and the set number of occurrences V3 to the alert notification device 120. Subsequently, in step S401 of FIG. 13, the receiver 133 of the alert notification device 120 receives the second set value V2 and the set number of occurrences V3. Then, in step S403, the time setter 139 of the alert notification device 120 sets the second set value V2 as the second time T2. In step S405, the time setter 139 sets the set number of occurrences V3 as the reference number of occurrences C2. The second time T2 set at the second set value V2 and the reference number of occurrences C2 set at the set number of occurrences V3 are stored in the memory 131.

The time setter 139 may set the second time T2 and the reference number of occurrences C2 for each type of the error information E1 or may set the same second time T2 and the same reference occurrence number C2 for all the types of error information E1, in a manner similar to the first time T1. The time setter 139 may set the same second time T2 and the same reference number of occurrences C2 for a plurality of dental processing machines 100, or may set different second times T2 and different reference occurrence numbers C2 for the plurality of dental processing machines 100.

In this preferred embodiment, as described above, the alert notification device 120 issues the alert AL2 concerning the type of the error information E1 of errors that occurred the reference number of times C2 in the retroactive time (second time T2) among the types of errors that occurred in the monitoring time (first time T1). For this notification, in step S305 of FIG. 12, the second extractor 142 of the alert notification device 120 extracts, as the second extracted error information E22, the type of the error information E1 of errors that occurred the reference number of times C2 in the second time T2 from the error information E1 received by the receiver 133. In this example, even in a case where errors of the type of the error information E1 occurred the reference number of times C2 in the second time T2, for example, if an error corresponding to the first time T1 does not occur, this error information E1 is not extracted as the second extracted error information E22.

For example, in a case where the reference number of occurrences C2 is five, in the example of FIG. 10, errors of the type A occurred three times in the second time T2, and the number of occurrences is smaller than the reference number of occurrences C2. Thus, error information E1 concerning the type A is not extracted as the second extracted error information E22. Errors of the type B occurred a number of times greater than or equal to the reference number of occurrences C2 in the second time T2.

Errors of the type B also occurred in the first time T1. Thus, error information E1 concerning the type B is extracted as the second extracted error information E22. Errors of the type C occurred a number of times greater than or equal to the reference number of occurrences C2 in the second time T2, and did not occur in the first time T1. Thus, error information E1 concerning the type C is not extracted as the second extracted error information E22. As described above, in the case of example of FIG. 10, the second extractor 142 extracts the error information E1 concerning the type B as the second extracted error information E22.

In the manner described above, in step S305 of FIG. 12, the second extractor 142 extracts the second extracted error information E22, and then, in step S307, the notifier 149 of the alert notification device 120 notifies the management device 150 of an alert AL2 concerning the second extracted error information E22. In this example, as shown in FIG. 8, in a manner similar to the alert AL1 concerning the first extracted error information E21, the notifier 149 notifies an email address previously set in the management device 150 of the alert AL2 concerning the second extracted error information E22. In this example, the alert AL2 concerning the second extracted error information E22 may be issued by the same email M1 as that for the alert AL1 concerning the first extracted error information E21, or may be issued by an email different from that for the alert AL1 concerning the first extracted error information E21. The alert AL2 concerning the second extracted error information E22 may be issued to a different email address from that of the alert AL1 concerning the first extracted error information E21, or may be issued to the same email address as that of the alert AL1. In this preferred embodiment, the time when the alert AL2 concerning the second extracted error information E22 is issued is the time when a predetermined notification time T3 (see FIG. 5) has elapsed, in a manner similar to the alert AL1 concerning the first extracted error information E21.

The foregoing description is directed to notification of the alerts AL1 and AL2 concerning the error information E1 upon an occurrence of an error in the dental processing machine 100. Although the notification of the alerts AL1 and AL2 is alert notification upon an occurrence of an error, in this preferred embodiment, notification of an alert that predicts the occurrence of an error, that is, notification of a predictive alert, can be issued before an error occurs in the dental processing machine 100. For example, while the processing target 5 is being processed by the dental processing machine 100, a sensing value for a specific part is detected. The alert notification device 120 acquires the sensing value, and if the acquired sensing value is larger than a predetermined threshold, the alert notification device 120 notifies the management device 150 of an alert concerning sensing.

Figure 14:
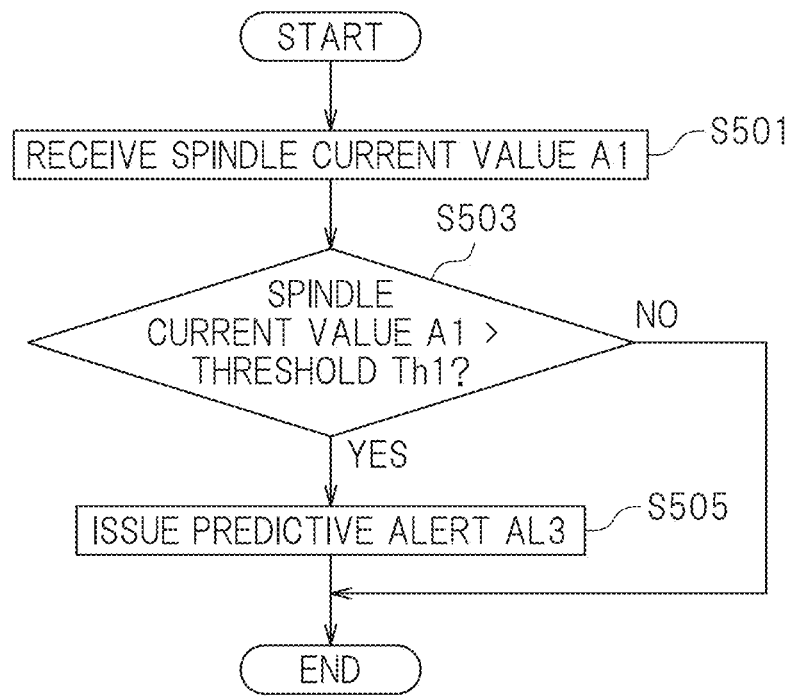
FIG. 14 is a flowchart depicting a procedure of notification of a predictive alert.

A procedure of notification of a predictive alert AL3 will now be described with reference to the flowchart of FIG. 14, using an example of a sensing value to the spindle 31 (see FIG. 3) of the processing mechanism 13 of the dental processing machine 100 as the sensing value described above. As described above, in the dental processing machine 100, the processing tool 8 rotated by the spindle 31 is brought into contact with the processing target 5 so that the processing target 5 is processed. At this time, the spindle 31 is rotated in accordance with the magnitude of a value of a current flowing in the spindle 31. However, if a failure occurs during processing and prevents the spindle 31 from rotating appropriately irrespective of a flow of a necessary current, the value of a current flowing in the spindle 31 increases so that an error occurs. In view of this, in this preferred embodiment, the value of the current flowing in the spindle 31 is sensed, and the predictive alert AL3 is issued based on the current value of the spindle 31.

In this example, first, the current value acquirer 65 (see FIG. 5) of the dental processing machine 100 acquires a spindle current value A1 that is the value of a current flowing in the spindle 31. Then, the dental transmitter 63 of the dental processing machine 100 transmits the spindle current value A1 flowing in the spindle 31 to the alert notification device 120. Thereafter, in step S501 of FIG. 14, the receiver 133 of the alert notification device 120 receives the spindle current value A1.

Subsequently, in step S503, the current value determiner 147 (see FIG. 5) of the alert notification device 120 determines whether the spindle current value A1 received by the receiver 133 is higher than a threshold Th1 or not. Since the threshold Th1 is a value indicating a failure because the current flowing with the spindle current value A1 is an overcurrent. The threshold Th1 is previously set in the memory 131 shown in FIG. 5. The threshold Th1 may be set for each dental processing machine 100, or may be set by the maintenance company.

In this example, in step S503, if the current value determiner 147 determines that the spindle current value A1 is the threshold Th1 or less, notification of the predictive alert AL3 concerning the spindle 31 is not issued. On the other hand, if the current value determiner 147 determines that the spindle current value A1 is larger than the threshold Th1, the process proceeds to step S505 in FIG. 14. In step S505, the notifier 149 notifies the management device 150 of the alert AL3 concerning the spindle 31. The method for notification of the predictive alert AL3 concerning the spindle 31 is not specifically limited. The notification of the predictive alert AL3 may be performed by sending an email to an email address set in the management device 150 or may be performed by displaying a given message on the management screen DP1 (see FIG. 11) displayed on the management display 151.

The alert notification device 120 according to this preferred embodiment may issue an alert concerning maintenance of the dental processing machine 100 to the management device 150. For example, the dental processing machine 100 includes the replacement part 38 (see FIG. 3) described above. The replacement part 38 is recommended to be replaced when the predetermined reference use time T5 (see FIG. 15) has elapsed. The replacement part 38 is, for example, the processing tool 8 or the spindle 31. The processing tool 8 and the spindle 31 are consumable parts, and are replaced by new parts after a lapse of a predetermined time or a predetermined number of times of use. In this example, the reference use time T5 is set for each of the plurality of processing tools 8, and the reference use time T5 is also set for the spindle 31.

Figure 15:
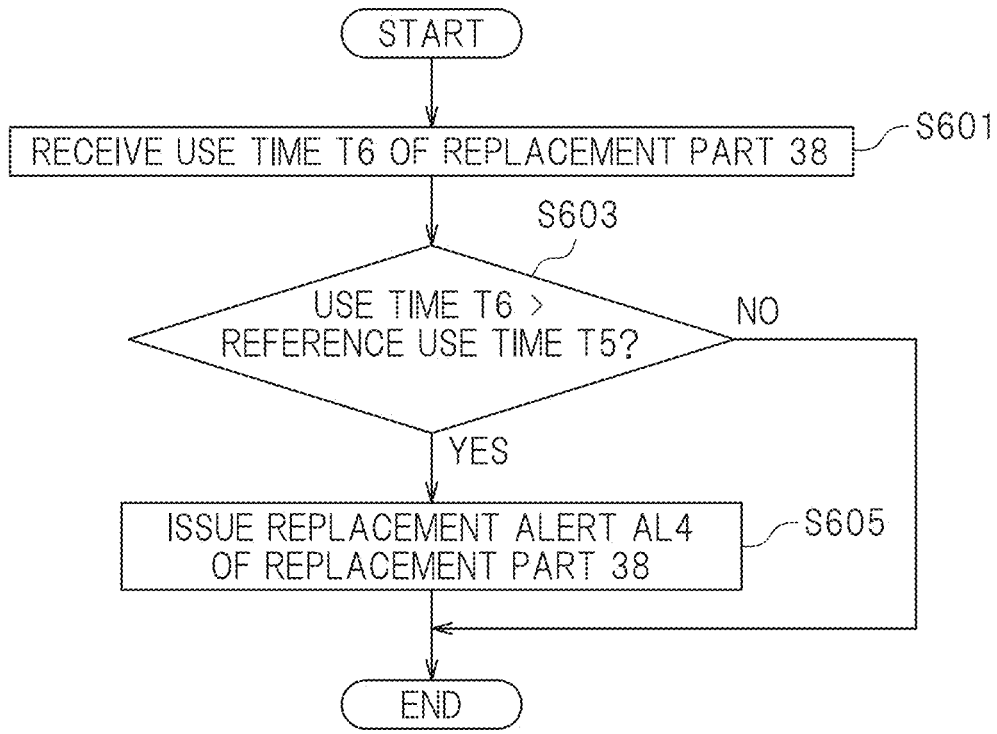
FIG. 15 is a flowchart depicting a procedure of notification of a replacement alert for a replacement part.

A procedure of notification of a replacement alert AL4 concerning the spindle 31 of the replacement part 38 will now be described with reference to the flowchart of FIG. 15. In this preferred embodiment, the time calculator 66 (see FIG. 5) of the dental processing machine 100 calculates the use time T6 that is a time in which the spindle 31 of the replacement part 38 is used. Thereafter, the dental transmitter 63 in FIG. 5 transmits the use time T6 to the alert notification device 120. Subsequently, in step S601 of FIG. 15, the receiver 133 of the alert notification device 120 receives the use time T6 of the spindle 31 of the replacement part 38.

Then, in step S603, the time determiner 145 (see FIG. 5) of the alert notification device 120 determines whether the user time T6 received by the receiver 133 is longer than the reference use time T5 or not. In this example, the reference use time T5 is a time set for each replacement part 38 as described above, and in this preferred embodiment, set for the processing tool 8 and for the spindle 31. The reference use time T5 is a time as a reference encouraging replacement of the replacement part 38. The reference use time T5 is previously stored in the memory 131.

In step S603, if the time determiner 145 determines that the use time T6 of the spindle 31 of the replacement part 38 is less than or equal to the reference use time T5, notification of the replacement alert AL4 encouraging replacement of the replacement part 38 is not issued. On the other hand, if the time determiner 145 determines that the use time T6 of the spindle 31 of the replacement part 38 is longer than the reference use time T5, the process proceeds to step S605 in FIG. 15. In step S605, the notifier 149 notifies the management device 150 of the replacement alert AL4 concerning replacement in the spindle 31 of the replacement part 38. The method for notification of the replacement alert AL4 concerning replacement of the replacement part 38 is not specifically limited. The notification of the replacement alert AL4 may be performed by sending an email to an email address set in the management device 150. As shown in FIG. 11, the use time T6 of the spindle 31 is displayed on the management screen DP1. Thus, this use time T6 may be changed to a bold text or a red text for notification of the replacement alert AL4.

In this preferred embodiment, the management screen DP1 in FIG. 11 displays an automatic correction completion time T8 that is a date when automatic correction was performed and a holder maintenance time T9 that is a date when maintenance concerning the tool holder 32 was performed. The automatic correction herein refers to maintenance to collect an origin position of the spindle 31. The spindle 31 is caused to move by the moving mechanism 33 (see FIG. 5) as described above, and a positional shift can occur after a long-term use. A predetermined origin position is set for the spindle 31, and the positional shift of the spindle 31 is less likely to occur by adjusting the origin position. For example, when automatic correction is performed, an automatic correction completion signal is transmitted from the dental processing machine 100 to the management device 150 through the alert notification device 120. At this time, the management controller 153 displays, as the automatic correction completion time T8, a date when the automatic correction completion signal is received on the management screen DP1 in FIG. 11. The automatic correction completion time T8 may be a date when automatic correction is actually completed (i.e., operation of automatic correction is physically completed). For example, the terminal receiver 116 of the operation terminal 110 receives notification that automatic correction is completed in the dental processing machine 100. The date when the terminal receiver 116 receives this notification is stored as the automatic correction completion time T8 in the terminal memory 115. The automatic correction completion time T8 stored in the terminal memory 115 is transmitted to the management device 150 through the alert notification device 120, and displayed on the management screen DP1 in FIG. 11.

Maintenance concerning the tool holder 32 refers to maintenance to confirm whether the tool holder 32 can appropriately hold the processing tool 8 or not. For example, when maintenance concerning the tool holder 32 is performed, a holder completion signal is transmitted from the dental processing machine 100 to the management device 150 through the alert notification device 120. At this time, the management controller 153 displays, as the holder maintenance time T9, a date when the holder completion signal is received on the management screen DP1 in FIG. 11. With respect to the automatic correction completion time T8 and the holder maintenance time T9, an alert encouraging maintenance may be issued by changing the display to bold or red characters when a predetermined time (not shown) has elapsed.

In this preferred embodiment, in the dental processing machine 100, when given maintenance is completed, maintenance information E3 (see FIG. 11) is transmitted to the management device 150 through the alert notification device 120. The management controller 153 that has received the maintenance information E3 displays, as a maintenance history, the maintenance information E3 on the management screen DP1 in FIG. 11. Items included in the maintenance information E3 are not specifically limited. The maintenance information E3 includes, for example, a maintenance date 211, a device ID 212, a maintenance content 213, and a message 214. The maintenance date 211 is a date when given maintenance was performed, such as a date when the management device 150 received the maintenance information E3. The device ID 212 is an ID uniquely assigned to each dental processing machine 100, and is a device ID of the dental processing machine 100 for which given maintenance was performed. The maintenance content 213 is a content of maintenance performed on the dental processing machine 100. The message 214 includes details of the maintenance content 213 are displayed.

As described above, in this preferred embodiment, the alert notification system 1 includes the dental processing machine 100, the alert notification device 120 of the dental processing machine 100, and the management device 150 to be used by the maintenance company to perform maintenance of the dental processing machine 100, as illustrated in FIG. 1. As shown in FIG. 5, the alert notification device 120 of the dental processing machine 100 includes the receiver 133, the first extractor 141, and the notifier 149. In step S101 of FIG. 6, the receiver 133 is configured or programmed to receive error information E1 from the dental processing machine 100. In step S103, the first extractor 141 is configured or programmed to extract, as the first extracted error information E21, error information E1 that occurred in the predetermined first time T1 from the error information E1 received by the receiver 133. In step S105, the notifier 149 is configured or programmed to notify the maintenance device 150 to be used by the maintenance company to perform maintenance of the dental processing machine 100 of the alert AL1 concerning the first extracted error information E21.

Accordingly, as shown in FIG. 6, when an error occurs in the dental processing machine 100, error information E1 concerning this error is received, and error information E1 that occurred in the first time T1 is extracted as the first extracted error information E21. Then, the maintenance company is notified of the alert AL1 concerning the first extracted error information E21. Thus, notification of the alert AL1 enables the maintenance company to know the type of the error that occurred in the dental processing machine 100. Thus, the maintenance company is able to know of the occurrence of the error in the dental processing machine 100 quickly without waiting for contact from a user of the dental processing machine 100. In addition, in this preferred embodiment, as shown in FIG. 8, the first time T1 is a monitoring time, the first extracted error information E21 is information concerning an error that occurred in the dental processing machine 100 immediately before, and error information necessary for the maintenance company to know whether the current state of the dental processing machine 100 is normal or not. Thus, notification of the alert AL1 concerning the first extracted error information E21 allows the maintenance company to know the current state of the dental processing machine 100 more quickly.

In this preferred embodiment, the dental processing machine 100 includes the controller 60 including the dental transmitter 63 that is configured or programmed to transmit error information E to the alert notification device 120, as shown in FIG. 5. As described above, when an error occurs in the dental processing machine 100, error information E1 concerning this error is transmitted from the dental transmitter 63 to the alert notification device 120. Thus, the alert notification device 120 can more reliably acquire the error information E1 that occurred in the dental processing machine 100 in real time.

In this preferred embodiment, in step S201 of FIG. 9, the receiver 133 receives the first set value V1 of the first time T1 set by the maintenance company from the management device 150. The alert notification device 120 includes the time setter 139 (see FIG. 5) that is configured or programmed to set the first set value V1 received by the receiver 133 as the first time T1 in a manner similar to step S203. The first time T1 is a monitoring time in which an error of the dental processing machine 100 is intended to be monitored (see FIG. 8), and unlike the first set value V1 of the first time T1, it is difficult to uniquely determine the first time T1 depending on the maintenance company, and the use time and the type of the dental processing machine 100 to be monitored. In view of this, in this preferred embodiment, the first set value V1 set by the maintenance company is set as the first time T1 so that the first time T1 can be determined depending on the user time and the type of the dental processing machine 100. Accordingly, the first set value V1 of the first time T1 can be set by the maintenance company, and the first set value V1 has flexibility.

In this preferred embodiment, the time setter 139 shown in FIG. 5 sets the first time T1 for each type of the error information E1. The type of the error information E1 herein refers to the type of an error that occurred in the dental processing machine 100. Importance varies depending on the type of an error. For example, a time considered necessary by the maintenance company can be different between a first time T1 for an error that can be solved by a user and a first time T1 for an error requiring a visit by the maintenance company. In view of this, in this preferred embodiment, the first time T1 is set for each type of the error information E1 so that the first time T1 considered necessary by the maintenance company can be set for each type of the error information E1.

For example, in some dental processing machines 100, errors can frequently occur. In this case, if the alert AL1 is issued at each occurrence of an error, this notification is annoying to the maintenance company, and the number of notifications of the alert AL1 is enormous. Thus, necessary error information E1 might be buried in the enormous amount of notification of the alert AL1. In view of this, in this preferred embodiment, the notifier 149 issues the alert AL1 at a time when the predetermined notification time T3 (see FIG. 5) has elapsed from a previous notification of the alert AL1. This can reduce frequency of notifications of the alert AL1, and thus, necessary error information E1 is less likely to be buried in the enormous number of notifications of the alert AL1.

Figure 12:
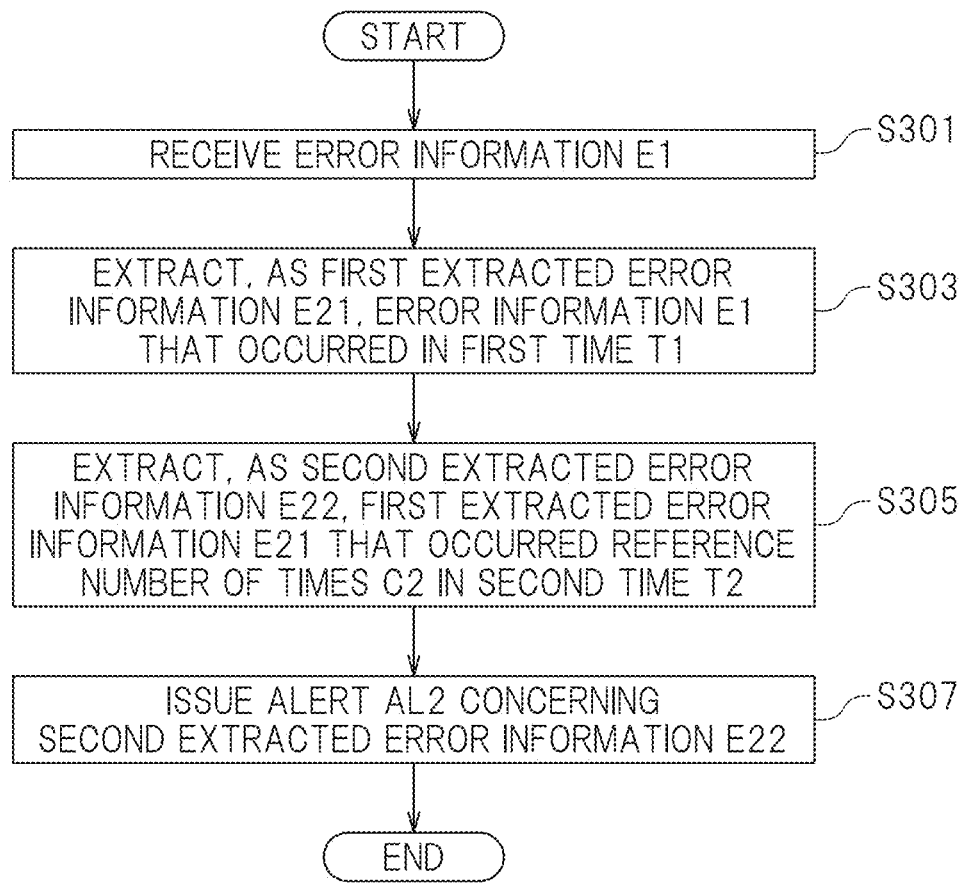
FIG. 12 is a flowchart depicting a procedure of notification of an alert concerning second extracted error information from the alert notification device to the management device.

In this preferred embodiment, as in step S305 of FIG. 12, the alert notification device 120 includes the second extractor 142 (see FIG. 5) that is configured or programmed to extract, as the second extracted error information E22, the type of the error information E1 that occurred the predetermined reference number of times C2 in the predetermined second time T2 from the error information E1 received by the receiver 133. In step S307, the notifier 149 notifies the management device 150 of the alert AL2 concerning the second extracted error information E22. Accordingly, the first time T1 and the second time T2 that are two different times can be set as target times for which the alerts AL1 and AL2 are issued. Thus, the alerts AL1 and AL2 concerning error information E1 can be issued in two stages.

In this preferred embodiment, as shown in FIG. 10, the second time T2 is longer than the first time T1. As in step S305 of FIG. 12, the second extractor 142 extracts, as the second extracted error information E22, the type of the first extracted error information E21 that occurred the reference number of times C2 in the second time T2 from the first extracted error information E21 extracted by the first extractor 141. As shown in FIG. 8, the second time T2 is a retroactive time. The type of the first extracted error information E21 that occurred in the first time T1 as a monitoring time and of the first extracted error information E21 of errors that occurred the reference number of times C2 in the second time T2 can be assumed to be the type of the error information E1 that continuously occurs. The maintenance company is able to know the type of errors that continuously occur by notification of the alert AL2 concerning the second extracted error information E22.

In this preferred embodiment, the notifier 149 notifies an email address previously set in the management device 150 of the alert AL1 by the email M1 as shown in FIG. 8. Accordingly, the plurality of management devices 150 can be notified of the alert AL1 with a simple method of setting email addresses to the plurality of management devices 150. As a result, the maintenance company is allowed to be more quickly notified of the alert AL1.

In this preferred embodiment, the alert notification device 120 includes the address setter 137 (see FIG. 5) that is configured or programmed to set an email address to be notified of the alert AL1 for each type of the error information E1. Some types of error information E1 can be of small importance or high importance. By setting an email address to be notified of the alert AL1 depending on the type of the error information E1 as described above, a destination of the alert AL1 concerning error information E1 having higher importance can be distinguished from a destination of the alert AL1 concerning error information E1 having low importance.

In this preferred embodiment, as illustrated in FIG. 1, the alert notification system 1 includes the plurality of dental processing machines 100. The notifier 149 of the alert notification device 120 issues the alert AL1 concerning the first extracted error information E21 to the plurality of dental processing machines 100 collectively. Accordingly, the maintenance company is able to know the first extracted error information E21 of errors that occurred in the plurality of dental processing machines 100 by notification of one alert AL1. As a result, error information E1 to the plurality of dental processing machines 100 can be easily managed.

In this preferred embodiment, the address setter 137 sets an email address to be notified of the alert AL1 for each dental processing machine 100. Accordingly, even in the case where error information E1 of the plurality of dental processing machines 100 is managed, destinations of notification of the alert AL1 of error information E1 of the plurality of dental processing machines 100 can be classified by email addresses. As a result, error information E1 can be easily managed for each dental processing machine 100.

In this preferred embodiment, the dental processing machine 100 includes the replacement part 38 (see FIG. 3) to be replaced when the predetermined reference use time T5 (see FIG. 15) has elapsed. The replacement part 38 is the processing tool 8 to cut the processing target 5 by the dental processing machine 100 or the spindle 31 to rotate the processing tool 8. The dental transmitter 63 in FIG. 5 transmits the use time T6 in which the replacement part 38 is used, to the alert notification device 120. In step S601 of FIG. 15, the receiver 133 of the alert notification device 120 receives the use time T6. The alert notification device 120 includes the time determiner 145 (see FIG. 5) configured or programmed to determine whether the use time T6 received by the receiver 133 is longer than the reference use time T5 or not, as in step S603. If the time determiner 145 determines that the use time T6 is longer than the reference use time T5, the notifier 149 of the alert notification device 120 issues the replacement alert AL4 concerning replacement of the replacement part 38 in step S605. Accordingly, even in a case where a user fails to replace the replacement part 38, for example, the maintenance company is notified of the replacement alert AL4 concerning replacement of the replacement part 38. Thus, failures in replacing the replacement part 38 can be reduced. If the use time T6 of the replacement part 38 exceeds the reference use time T5 and the replacement part 38 continues to be used, a failure is more likely to occur in the dental processing machine 100, and the frequency of errors can increase. In this preferred embodiment, failures in replacing the replacement part 38 is reduced or prevented so that the occurrence of errors caused by failures in replacing the replacement part 38 can be reduced or prevented.

In this preferred embodiment, the spindle 31 of the dental processing machine 100 rotates the processing tool 8 for processing the processing target 5 by a flow of current. The dental transmitter 63 transmits the spindle current value A1 flowing in the spindle 31, to the alert notification device 120. In step S501 of FIG. 14, the receiver 133 of the alert notification device 120 receives the spindle current value A1. The alert notification device 120 includes the current value determiner 147 (see FIG. 5) that is configured or programmed to determine whether the spindle current value A1 received by the receiver 133 is larger than the predetermined threshold Th1 or not, as in step S503. If the current value determiner 147 determines that the spindle current value A1 is larger than the threshold Th1, the notifier 149 of the alert notification device 120 issues the predictive alert AL3 concerning the spindle 31 in step S505. In the dental processing machine 100, the spindle 31 rotates in accordance with the magnitude of a value of a current flowing in the spindle 31. However, if a failure occurs during processing so that the spindle does not rotate appropriately irrespective of a flow of a necessary current, the current value flowing in the spindle 31 increases, and an error occurs. In view of this, in this preferred embodiment, if the spindle current value A1 flowing in the spindle is larger than the threshold Th1, it is determined that an overcurrent occurs, and the predictive alert AL3 concerning the spindle 31 is issued. Thus, the maintenance company is allowed to be notified of the predictive alert AL3 before an error concerning the spindle 31 occurs.

In this preferred embodiment, the maintenance company is notified of various alerts AL1 through AL4. Thus, the maintenance company is able to know a failure in the dental processing machine 100 beforehand, and thus, a visit plan for maintenance of the dental processing machine 100 can be easily made, and maintenance can be easily conducted in an appropriate period. In addition, since the maintenance company is able to know a failure in the dental processing machine 100 beforehand, the replacement part 38 can be prepared when a failure occurs. Thus, an excessive inventory of replacement parts 38 of the dental processing machine 100 can be eliminated.

This preferred embodiment includes a computer program for alert notification in order to implement the memory 131, the receiver 133, the transmitter 135, the address setter 137, the time setter 139, the first extractor 141, the second extractor 142, the time determiner 145, the current value determiner 147, and the notifier 149 of the dental processing machine 100. The computer program for alert notification causes a computer to execute the functions of the memory 131, the receiver 133, the transmitter 135, the address setter 137, the time setter 139, the first extractor 141, the second extractor 142, the time determiner 145, the current value determiner 147, and the notifier 149.

In this preferred embodiment, the error information E1 concerning an error that occurred in the dental processing machine 100 is transmitted from the dental processing machine 100 directly to the alert notification device 120. Alternatively, the error information E1 may be transmitted to the alert notification device 120 from the operation terminal 110 to operate the dental processing machine 100. In this case, the error information E1 is transmitted from the dental transmitter 63 of the dental processing machine 100 to the operation terminal 110, for example, and the terminal receiver 116 of the operation terminal 110 receives the error information E1. At this time, the error information E1 is stored in the terminal memory 115. Thereafter, the terminal transmitter 117 of the operation terminal 110 transmits the error information E1 to the alert notification device 120. Then, the receiver 133 of the alert notification device 120 receives the error information E1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An alert notification system comprising:
   a dental processing machine;
   a management device configured or programmed to be used by a maintenance company to perform maintenance of the dental processing machine; and
   an alert notification device including:
      a receiver configured or programmed to receive error information from the dental processing machine;
      a first extractor configured or programmed to extract from the error information received by the receiver, as first extracted error information, error information that occurred in a predetermined first time; and
      a notifier configured or programmed to notify the management device of an alert concerning the first extracted error information, the management device being usable by the maintenance company to perform maintenance of the dental processing machine, wherein
   the error information includes an error ID and a device ID;
   the error ID uniquely specifies a type of an error;
   the device ID is an ID uniquely assigned to the dental processing machine;

the notifier is configured or programmed to notify an email address previously set in the management device of the alert by an email;

the dental processing machine includes a controller including a dental transmitter configured or programmed to transmit the error information to the alert notification device;

the first time is a time period from a current time to a previous time and is set by the maintenance company as a time period to determine whether an error occurred in the dental processing machine;

the dental processing machine includes a spindle configured to cause a processing tool to process a processing target by rotating upon a flow of a current;

the dental transmitter is configured or programmed to transmit a spindle current value of the current flowing in the spindle to the alert notification device;

the receiver of the alert notification device is configured or programmed to receive the spindle current value;

the alert notification device includes a current value determiner configured or programmed to determine whether the spindle current value received by the receiver is larger than a predetermined threshold or not; and if the current value determiner determines that the spindle current value is larger than the predetermined threshold, the notifier of the alert notification device is configured or programmed to issue an alert concerning the spindle.

2. The alert notification system according to claim 1, wherein
the receiver is configured or programmed to receive a set value of the first time from the management device, the set value being set by the maintenance company; and
the alert notification device further comprises a time setter configured or programmed to set the set value received by the receiver as the first time.

3. The alert notification system according to claim 2, wherein the time setter is configured or programmed to set the first time for each type of the error information.

4. The alert notification system according to claim 1, wherein the notifier is configured or programmed to issue the alert at a time when a predetermined notification time has elapsed from notification of a previous alert.

5. The alert notification system according to claim 1, further comprising:
a second extractor configured or programmed to extract from the error information received by the receiver, as second extracted error information, a type of the error information that occurred a predetermined reference number of times in a predetermined second time; wherein
the notifier is configured or programmed to notify the management device of an alert concerning the second extracted error information.

6. The alert notification system according to claim 5, wherein
the second time is longer than the first time; and
the second extractor is configured or programmed to extract from the first extracted error information extracted by the first extractor, as the second extracted error information, a type of the first extracted error information that occurred the predetermined reference number of times in the second time.

7. The alert notification system according to claim 1, further comprising an address setter configured or programmed to set the email address to be notified of the alert, for each type of the error information.

8. The alert notification system according to claim 1, wherein
the dental processing machine includes a replacement part to be replaced when a predetermined reference use time has elapsed;
the dental transmitter is configured or programmed to transmit, to the alert notification device, a use time in which the replacement part is used;
the receiver of the alert notification device is configured or programmed to receive the use time;
the alert notification device includes a time determiner configured or programmed to determine whether the use time received by the receiver is longer than the reference use time or not; and
if the time determiner determines that the use time is longer than the reference use time, the notifier of the alert notification device is configured or programmed to issue an alert concerning replacement of the replacement part.

9. The alert notification system according to claim 8, wherein the replacement part is either the processing tool to cut the processing target by the dental processing machine or the spindle to rotate the processing tool.

10. The alert notification system according to claim 1, further comprising a plurality of dental processing machines; wherein
the notifier of the alert notification device is configured or programmed to issue the alert concerning the first extracted error information regarding the plurality of dental processing machines collectively.

11. The alert notification system according to claim 10, wherein
the alert notification device includes an address setter configured or programmed to set the email address to be notified of an alert for each of the dental processing machines.

12. The alert notification system according to claim 1, wherein the dental processing machine includes an error detector configured or programmed to detect an error of the dental processing machine generated during the processing of the processing target.

* * * * *